US008769133B2

(12) United States Patent
Hayward

(10) Patent No.: US 8,769,133 B2
(45) Date of Patent: *Jul. 1, 2014

(54) NETWORK-BASED VERIFICATION AND FRAUD-PREVENTION SYSTEM

(75) Inventor: Blake Earl Hayward, Redwood Shores, CA (US)

(73) Assignee: Yodlee.com, Inc., Redwood City, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 13/046,010

(22) Filed: Mar. 11, 2011

(65) Prior Publication Data

US 2011/0162052 A1 Jun. 30, 2011

Related U.S. Application Data

(63) Continuation of application No. 09/661,589, filed on Sep. 14, 2000, now Pat. No. 7,930,411, which is a continuation-in-part of application No. 09/461,515, filed on Dec. 14, 1999, now abandoned, which is a continuation-in-part of application No. 09/425,626, filed on Oct. 22, 1999, now Pat. No. 6,802,042, which is a continuation-in-part of application No. 09/323,598, filed on Jun. 1, 1999, now Pat. No. 6,199,077, which is a continuation-in-part of application No. 09/208,740, filed on Dec. 8, 1998, now Pat. No. 6,412,073.

(51) Int. Cl.
*G06F 15/16* (2006.01)
*G06F 17/30* (2006.01)

(52) U.S. Cl.
USPC ............................................. 709/229; 726/2

(58) Field of Classification Search
USPC ................................................... 709/229
See application file for complete search history.

(56) References Cited

U.S. PATENT DOCUMENTS

| 5,845,070 A | * | 12/1998 | Ikudome ......................... 726/28 |
| 5,898,780 A | * | 4/1999 | Liu et al. ......................... 713/155 |
| 5,918,228 A | * | 6/1999 | Rich et al. ............................. 1/1 |
| 2010/0169958 A1 | * | 7/2010 | Werner et al. ..................... 726/6 |

\* cited by examiner

*Primary Examiner* — Asghar Bilgrami
(74) *Attorney, Agent, or Firm* — Donald R. Boys; Central Coast Patent Agency, Inc

(57) ABSTRACT

A system for authentication has an Internet-connected server providing services and software executing on the server from a non-transitory physical medium. The software provides a function for receiving a request for authentication from a person seeking service at the server, a function for requesting by the server one or more username/password pairs used for log-in for the person at one or more Internet sites remote from the server, a function for logging in by the server at the remote site or sites on behalf of the person, using the username/password pair or pairs provided by the person, and a function for authenticating the person at the server for interaction with the server.

4 Claims, 20 Drawing Sheets

Fraud Alert / User Interface

| Account | Institution | ON | OFF | PIN # |
|---|---|---|---|---|
| Credit Card Account # XXXXXXX | Visa | ● | ☐ | 4578 |
| Credit Card Account # XXXXXXX | MC | ● | ● | 7895 |
| ATM Card Account # XXXXXXX | B of A | ● | ☐ | 1245 |
| ATM Card Account # XXXXXXX | 1st Bank | ☐ | ● | |
| Savings Account Account # XXXXXXX | B of A | ☐ | ● | |
| Savings Account Account # XXXXXXX | ABC Bank | ☐ | ● | |

NETWORK-BASED VERIFICATION AND FRAUD-PREVENTION SYSTEM

CROSS-REFERENCE TO RELATED DOCUMENTS

The present application is a continuation of application Ser. No. 09/661,589, filed on Sep. 14, 2000, which is a continuation-in-part (CIP) of patent application Ser. No. 09/461,515 filed on Dec. 14, 1999 and now abandoned, which is a CIP to a U.S. patent application Ser. No. 09/425,626 filed on Oct. 22, 1999 and issued as 6802042 on Oct. 5, 2004, which is a CIP to a patent application Ser. No. 09/323,598, filed on Jun. 1, 1999 and issued as 6199077 on Mar. 26, 2001, which is a CIP to patent application Ser. No. 09/208,740, filed on Dec. 8, 1998 and issued as 6412073 on Jun. 25, 2002, disclosures of which are incorporated herein in their entirety at least by reference.

BACKGROUND OF THE INVENTION

1. Field of the Invention

The present invention is in the field of network communication and navigation services including Internet communication and navigation services. The present invention pertains particularly to methods and apparatus for providing online verification and fraud prevention services for business clients and individual users.

2. Discussion of the State of the Art

The information network known as the World Wide Web (WWW), which is a subset of the well-known Internet, is arguably the most complete source of publicly accessible information available. Anyone with a suitable Internet appliance such as a personal computer with a standard Internet connection may access (go online) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security, that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an online banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor and described in patent application Ser. No. 09/208,740 entitled "Method and Apparatus for Providing and Maintaining a User-Interactive Portal System Accessible via Internet or other Switched-Packet-Network", provides a WEB service that allows a user to store all of his password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service uses a server to present a user-personalized application that may be displayed as an interactive home page that contains all of his listed sites (hyperlinks) for easy navigation. The application lists the user's URL's in the form of hyperlinks such that a user may click on a hyperlink and navigate to the page wherein login, if required, is automatic, and transparent to the user.

The application described above also includes a software agent that may be programmed to perform scheduled tasks for the user including returning specific summaries and updates about user-account pages. A search function is provided and adapted to cooperate with the software agent to search user-entered URL's for specific content if such pages are cached somewhere in their presentable form such as at the portal server, or on the client's machine.

In addition to the features described above, patent application Ser. No. 09/523,598 entitled "Method and Apparatus for Obtaining and Presenting WEB Summaries to Users" describes a software agent used in conjunction with a search function that is enabled to navigate to any URL or group of URL's, provided as input by a user or otherwise deemed appropriate by the service provider, for the purpose of providing summary information regarding updated content for each URL, which may be presented as an HTML information-page to the user.

Users who subscribe to many online services generally do all of their banking, investing, travel arranging, shopping, and so on while online with the Internet. Having all of his or her services available at one portal provides a convenience to a user in not having to remember a plurality of passwords, or to be required to physically log-on to each site. Similarly, the ability to obtain summary data associated with selected sites through one interface allows a user to greatly speed any decision making process related to his or her online activity. However, summary information may not help a user with certain other concerns. For example, obtaining accurate financial information concerning his entire portfolio of banking and investments would require much user calculation depending on the exact nature of the result desired. Similarly compiling a trend that reflects a user's online activity at a plurality of shopping services may also be desired.

A system known to the inventor and disclosed in a co-pending patent application entitled "Method and Apparatus for Providing Calculated and Solution-Oriented Personalized Summary-Reports to a User through a Single User-Interface" provides a service that processes aggregated data from multiple WEB-sites to return calculated solutions based on user query. Such solution-oriented processing is accomplished through a unique database-reporting engine (DBRE) that has the required data processing means. Such a service can return many different kinds of solution-orientated reports to users on a scheduled or on-demand basis.

An enhancement to the above-described system entitled "Method and Apparatus for Providing Intelligent Recommendations to Users Regarding Online Activities Based on Knowledge of Data from a User's Multiple Web-services" teaches an Internet portal system for providing recommendations to subscribers of the portal, the system having a data gathering system operating on the portal system, gathering data from multiple Internet sites associated with the subscriber, a tracking system monitoring the subscriber's on-line activity, and a recommendation engine for transmitting recommendations to the subscriber. The system is characterized in that the portal system monitors the subscriber's on-line activity, and transmits recommendations to the subscriber based on the subscriber's on-line activity and on subscriber information stored in the data repository. The system can make recommendations in a variety of situations, such as when a subscriber is shopping on-line, making investment decisions, or making banking decisions, for example.

It has occurred to the inventor that intelligent recommendations regarding a user's online status or activity may also be made to requesting third-party services such as services which seek to authenticate a person for receiving an online account or other types of online services. For example, an online bill-pay service would typically, in a prior art scenario, require an individual to provide certain documents by mail in order for a requested service to be authenticated for activation. This is due to a fact that someone who has stolen their information may easily impersonate persons operating online. Customers who walk in to an institution or mail in documents are regarded as less of a security risk. The above-described practice is true for many third-party services dealing with customer accounts and other personal information.

The capabilities of navigating to Web destinations on behalf of users along with the profiling capabilities described in co-pending applications of this specification may be enhanced with a verification recommendation engine to provide effective and reliable verification services that may obfuscate the need for third-party entities to require hard-copy items for verification purposes. Such a system and service of the present invention is detailed in enabling disclosure provided herein.

SUMMARY OF THE INVENTION

A networked-based system for providing online verification of users applying for third-party services available through the network is provided. The system comprises, a first server node connected to the network for offering application to third-party services through the network; a user node connected the network for accessing the first server node and applying for third-party services, a second server node connected to the network and accessible from the first server node, the second server node for processing verification requests communicated from the first server node, a third server node connected the network and accessible from the second server node, the third server node for navigating on the network by proxy according to navigation requests communicated from the second server node, and a data repository accessible at least to the second server node for storing data about users being verified.

The system is characterized in that a user operating the user node accesses the first server node and applies for a service or services offered through the first server node and submits data for verification, the first server node sending the data in the form of a verification request to the second server node, the second server node creating a navigation request containing a portion of the submitted data and sending the navigation request to third server, the third server performing the navigation according to the request and reporting navigation results back to the second server, the second server reporting the results back to the first server for verification purposes.

In a preferred aspect, the system is based on a data-packet-network, which in preferred instances is the Internet network. Also in a preferred aspect, the second and third server nodes of the system are hosted by a same service provider. In one aspect, the third-party services available through the network are financial management services.

In some cases, the user node operated to apply for third-party services is a personal computer having access to the network. In some cases, the user node is a wireless Internet-capable appliance. In still other cases, the user node is a telephone. In a preferred embodiment, application for third-party services is accomplished by populating a software-driven, electronic interface. In this aspect, the interface is an electronic form on a web page.

In all embodiments, a portion of data submitted for verification comprises at least one user name and password set for accessing a user-held online reference account. In one aspect, non-sensitive data submitted for verification is compared against user profile data for verification purposes if the profile data is available at the service. In another aspect, only sensitive data submitted with the form is used for verification purposes.

In some aspects of the system, the verification results from navigation are equated to a score using a scoring system. In other aspects, the verification results are of the form of an approval or disapproval.

In another aspect of the present invention, a method for online verification of a user applying for third-party services available on a data-packet-network is provided. The method includes the steps of (a) the user interacting with the site offering the third-party services, the interaction comprising the population and submission of an electronic form for online verification purposes; (b) the online application form routed to a site offering the verification service, the service-site creating a temporary user profile and a navigation request from the data submitted in the form; (c) the navigation request routed to navigation system, the system performing the proxy navigation sequence according to the request; (d) the navigation system reporting the results of the automated navigation sequence back to the verification site; and (e) the verification site sending a verification recommendation back to the site offering the third party services.

In preferred application, the method is practiced on a data-packet-network, which in a preferred instance is the Internet network. In this aspect, in step (a), the site is a third-party server accessed from an Internet-capable appliance operated by the user. In this application, the site of step (b) is a verification server hosted by a verification service provider. In all applications of the method, in step (b), the navigation request contains authentication data to at least one user-held online account.

In one aspect, in step (c), the navigation system comprises a server hosted by the verification service provider. In another aspect, in step (c), the navigation system comprises a plurality of interconnected servers hosted by the verification service provider. In some applications, in step (a), the third party services comprise proxy financial management services.

In one aspect of the method, in step (a), the site offering the third-party services is accessed by the user operating a telephone. In a preferred aspect, in step (a), electronic form is presented in a web page accessed from an Internet-capable appliance.

In all aspects of the method, in step (c), the data portion of the form enabling the proxy navigation sequence comprises at least one user-name and password set for logging into a user-held online account. In one aspect, in step (c), the data portion of the form enabling the proxy navigation sequence also includes at least one domain name and at least one URL address.

In one application, in step (b), non-sensitive data submitted for verification is compared against user profile data for verification purposes. Also in one application, in step (d), navigation results are equated to a score at the verification site using a scoring system.

Now for the first time, an online verification service is provided that allows a third-party service to adequately verify a user without requiring the user to submit hard-copy documentation through mail or by walk-in.

BRIEF DESCRIPTION OF THE DRAWING FIGURES

FIG. 18 is a plan view of an online interface for fraud prevention activation according to an embodiment of the present invention.

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
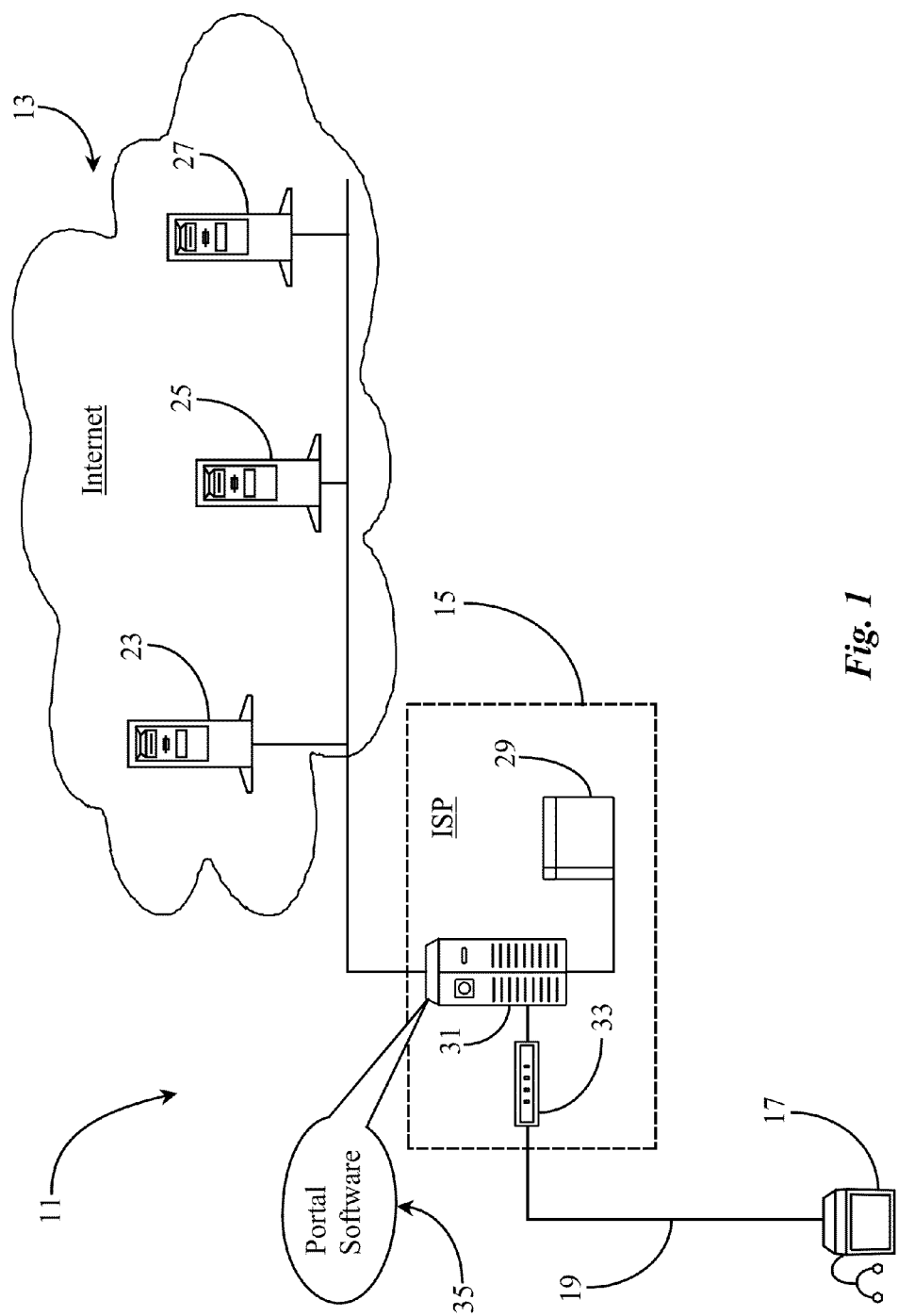
FIG. 1 is an overview of an Internet portal system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
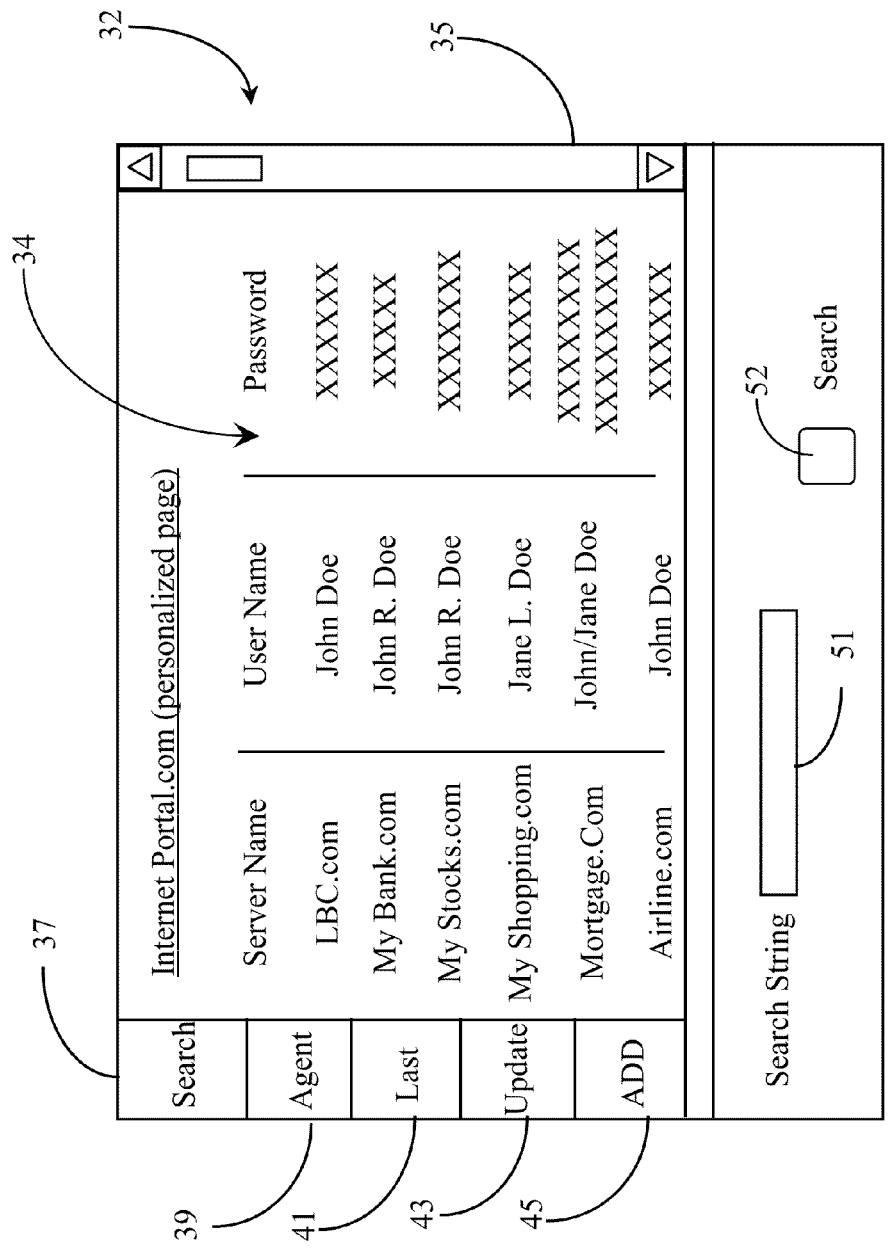
FIG. 2 is an exemplary plan view of a personalized Portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password. All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password-All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention, knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
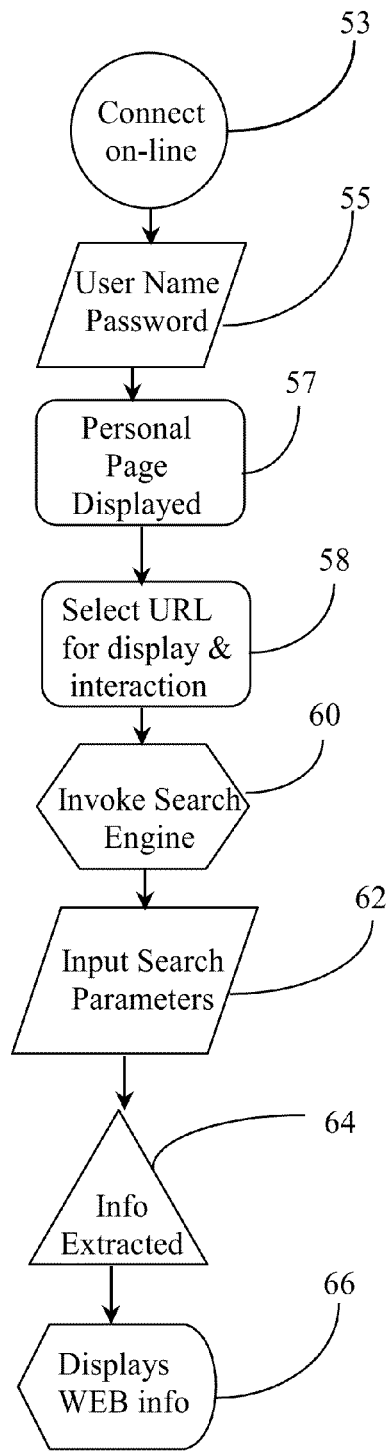
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password, which, In one embodiment may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Enhanced Agent for WEB Summaries

In another aspect of the present invention, a software agent, termed a gatherer by the inventors, is adapted to gather and return summary information about URL's according to user request or enterprise discretion. This is accomplished in embodiments of the present invention by a unique scripting and language parsing method provided by the inventor wherein human knowledge workers associated with the service provide written scripts to such a gatherer according to subscriber or enterprise directives. Such a software gatherer, and capabilities thereof, is described in enabling detail below.

Referring now to FIG. 1, there is illustrated an exemplary architecture representing a portal service-network which, in this case is hosted by ISP 15. Portal software 35 in this embodiment executes on portal server 31 set-up at the ISP location. Mass repository 29 is used for storing subscriber information such as passwords, login names, and the like. Internet servers 23, 25, and 27 represent servers that are adapted to serve WEB pages of enterprises patronized by a subscriber to the portal service such as one operating Internet appliance 17.

The main purpose of portal software 35 as described above with reference to FIG. 2, is to provide an interactive application that lists all of the subscriber's WEB sites in the form of hyperlinks. When a user invokes a hyperlink from his personal list, software 35 uses the subscriber's personal information to provide an automatic and transparent login function for the subscriber while jumping the subscriber to the subject destination.

Referring again to FIG. 2, an interactive list 34 containing user-entered hyperlinks and a set of interactive tools is displayed to a subscriber by portal software 35 of FIG. 1. One of the tools available to a subscriber interacting with list 34 is agent (software) 39. Agent 39 may be programmed to perform certain tasks such as obtaining account information, executing simple transactions, returning user-requested notification information about upcoming events, and so on. Search function 37 and update function 43 may be integrated with agent 39 as required to aid in functionality.

It is described in the above disclosure that agent 39 may, in some embodiments, search for and return certain summary information contained on user-subscribed WEB pages, such as account summaries, order tracking information and certain other information according to user-defined parameters. This feature may be programmed by a user to work on a periodic time schedule, or on demand.

In the following disclosure, enhancements are provided to agent 39. Such enhancements, described in detail below, may be integrated into agent 39 of portal software 35 (FIGS. 1 and 2); and may be provided as a separate agent or gatherer to run with portal software 35; or may, in some embodiments, be provided as a standalone service that is separate from portal software 35.

Figure 4:
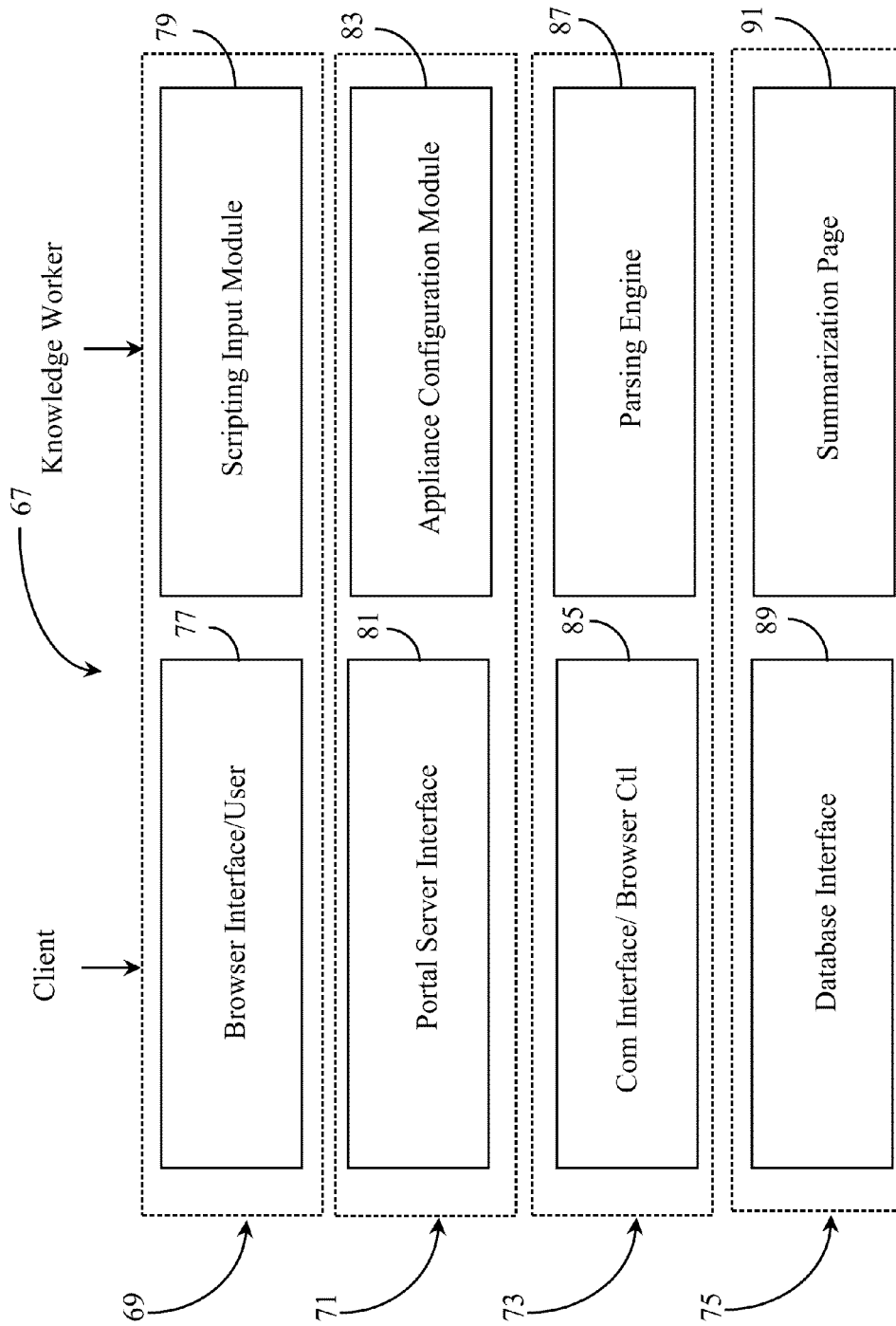
FIG. 4 is a block diagram illustrating a summarization software agent and capabilities thereof according to an embodiment of the present invention.

FIG. 4 is a block diagram illustrating a summarization software agent 67 and various capabilities and layers thereof according to an embodiment of the present invention. Summarization agent 67, hereinafter termed gatherer 67, is a programmable and interactive software application adapted to run on a network server. Gatherer 67 may, In one embodiment be integrated with portal software 35 of FIG. 1 and be provided in the form of a software module separate from agent 39 (FIG. 2). In another embodiment, gatherer 67 may be a part of agent 39 as an enhancement to the function of that agent as previously described. In still another embodiment, gatherer 67 may be provided as a parent or client-side application controlled by a separate service from the portal service described above.

In this exemplary embodiment gatherer 67 is a multi-featured software application having a variety of sub-modules and interface modules incorporated therein to provide enhanced function. Gatherer 67 has a client/service interface layer 69 adapted to enable directive input from both a client (user) and a knowledge worker or workers associated with the service. A browser interface 77 is provided in layer 69, and adapted to provide access to application 67 from a browser running on a client's PC or other Internet or network appliance. Interface 77 facilitates bi-directional communication with a user's browser application (not shown) for the purpose of allowing the user to input summary requests into gatherer 67 and receive summary results. Interface 77 supports all existing network communication protocols such as may be known in the art, and may be adapted to support future protocols.

Layer 69 also comprises a unique input scripting module 79 that is adapted to allow a human knowledge worker to create and supply directive scripts containing the site logic needed by gatherer 67 to find and retrieve data from a WEB site. In this case, gatherer 67 executes and runs on a network server such as server 31 of FIG. 1. However, this is not required in order to practice the present invention.

It is assumed in this example that gatherer 67 is part of the portal software suite 35 running on server 31 of FIG. 1. Gatherer 67 may be provided as several dedicated agents, or as one multi-functional agent without departing from the spirit and scope of the present invention. For example, one gatherer 67 may be scripted and programmed to execute a single user request with additional gatherers 67 called upon to perform additional user-requests. Alternatively, one gatherer 67 may be dedicated and assigned to each individual user and adapted to handle all requests from that user.

Interface layer 69 facilitates exchange of information from both a client and a knowledge worker. A client operating a WEB browser with an appropriate plug-in is enabled to communicate and interact with gatherer 67. For example, a user may enter a request to return a summary of pricing for all apartments renting for under $1000.00 per month located in a given area (defined by the user) from apartments.com (one of user's registered WEB sites). The just mentioned request would be categorized as either a periodic request, or a one time (on demand) request. The communicated request initiates a service action wherein a knowledge worker associated with the service uses module 79 to set-up gatherer 67 to perform its function. Module 79 is typically executed from a network-connected PC operated by the knowledge worker.

According to an embodiment of the present invention, a unique scripting method facilitated by module 79 is provided to enable gatherer 67 to obtain the goal information requested by a user. For example, the above mentioned example of WEB-site apartments.com has a specific HTML (hyper-text-markup-language) logic that it uses to create its site and post its information. Such site logic is relatively standard fare for a majority of different sites hosted by different entities. Using this knowledge, a knowledge worker creates a site-specific script or template for gatherer 67 to follow. Such a template contains descriptions and locations of the appropriate fields used, for example, at apartments.com. Apartment description, location, deposit information, rental information, agent contact information, and other related fields are matched in terms of location and label description on the template created with module 79. Completed templates are stored in a database contained in a storage facility such as, perhaps, repository 29 of FIG. 1. Such templates may be reused and may be updated (edited) with new data.

In one embodiment one script may contain site logics for a plurality of WEB pages, and instructions for specific navigational instruction and password or login information may be contained therein and executed serially, such as one site at a time. It is important to note that the knowledge worker or workers may perform much of their scripting via automatic controls such as by object linking and embedding (OLE) and a minor portion of scripting may be performed manually in an appropriate computer language, many of which are known in the art).

Gatherer 67 also has a process layer 71 adapted for internal information gathering and parameter configuration. An optional portal server interface 81 is provided and adapted to allow gather 67 to provide updated information to a user's list of hyperlinks and also to obtain data from portal server 31 if required. For example, required hyperlinks may be mirrored from a user's home page to a scripting template for navigational purposes. In an embodiment wherein gatherer 67 is part of a standalone service, a convention for providing user login information may be supplied at the client's end when a request is made. For example, an encrypted password may be supplied by a client plug-in and gatherer 67 may temporarily borrow the user's encryption key when auto login is performed.

An appliance configuration module 83 is provided and adapted to allow a user to define and configure an Internet appliance to communicate with the service and receive summary information. Such appliances may include but are not limited to palm top PC's, lap top PC's, cellular telephones, WEB TV's, and so on. Typically, a user will be presented a configuration WEB page from a network server that displays in his browser window on his desktop PC. The page contains an interface for communicating device parameters and communication protocol types to module 83. In this way, a user may configure a preferred device for receipt of summary information. Device parameters and communication protocols inherent to such a device are incorporated into the scripting of the site template and are used as instructions for WEB summary delivery.

A navigation layer 73 is provided and adapted to perform the function of external site navigation and data gathering for gatherer 67. To this end, a communication interface/browser control module 85 is provided and adapted to function as a WEB browser to access WEB sites containing WEB data. Control 85 receives it's instruction from the scripted template created by the knowledge worker.

A parsing engine 87 is provided and adapted to parse individual WEB sites according to a template created via scripting module 79. Parsing engine 87 may be a Pearl engine, an IE HTML engine, or any other or combination of known parsing engines. The template (not shown) tells control 85 and parsing engine 87 where to go and what fields at the destination site to look for to access desired data. Once the data fields are located, parsing engine 87 gathers current data in the appropriate field, and returns that data to the service for further processing such as data conversion, compression and storage, and the like.

Because WEB sites use tools that use consistent logic in setting up their sites, this logic may be used by the summarization service to instruct control 83 and parsing engine 87. The inventor provides herein an exemplary script logic for navigating to and garnishing data from Amazon™.com. The hyperlinks and/or actual URLs required for navigation are not shown, but may be assumed to be included in the template script. In this example, a company name Yodlee (known to the inventors) is used in the script for naming object holders and object containers, which are in this case Active X™ conventions. In another embodiment, Java™ script or another object linking control may be used. The scripted template logic example is as follows:

```
# Site amazon.orders.x - shows status of orders from Amazon
login( 7 );
get( "/exec/obidos/order-list/" );
my @tables = get_tables_containing_text( "Orders:" );
my $order_list = new Yodlee::ObjectHolder( 'orders' );
$order_list->source( 'amazon' );
$order_list->link_info( get_link_info( ) );
my @href_list;
my @container_list;
foreach my $table ( @tables ) {
  my @rows = get_table_rows( );
  foreach my $i ( 0 .. $#rows ) {
    select_row( $i );
    my $text = get_text( $rows[ $i ] );
    next if $text =~ /Orders:|Status/;
    my @items = get_row_items( );
            next unless @items >= 4;
            my( $order_num, $date, $status );
            select_cell( 1 );
            $order_num = get_cell_text( );
            my $href = get_url_of_first_href( get_cell( ) );
            select_cell( 2 );
            $date = get_cell_text( );
            select_cell( 3 );
            $status = get_cell_text( );
            next unless defined $order_num and defined $date
            and defined $status;
            my $order = new Yodlee::Container( 'orders' );
            $order->order_number( $order_num );
            $order->date( $date );
            $order->status( $status );
            $order_list->push_object( $order );
            if( defined $href ) {
                push( @href_list, $href );
                push( @container_list, $order );
  foreach my $i ( 0 .. $#href_list ) {
    get( $href_list[ $i ] );
    @tables = get_tables_containing_text( "Items
    Ordered:" );
  foreach my $table ( @tables ) {
    my @rows = get_table_rows( );
  foreach my $j ( 0 .. $#rows ) {
    select_row( $j );
    my $href = get_url_of_first_href( get_row( ) );
    next unless defined $href;
    my @child_list = get_children( get_row( ), 'a' );
    next unless defined $child_list[ 0 ];
    my $text = get_text( $child_list[ 0 ] );
    $container_list[ $i ]->description( $text );
}
            }
    }
    result( $order_list );
```

The above example is a script that instructs control 85 and parser 87 to navigate to and obtain data from Amazon™.com, specifically that data that reflects the user's current order status. Scripts may also be written to obtain virtually any type of text information available from any site. For example, a user may wish to obtain the New York Times headlines, the top ten performing stocks, a comparative list of flights from San Francisco to New York, etc. In one embodiment metadata may be associated with and used in-place of the actual scripted language for the purpose of reducing complication in the case of many scripts on one template.

A data processing layer 75 is provided and adapted to store, process, and present returned data to users according to enterprise rules and client direction. A database interface module 89 is provided and adapted to provide access for gatherer 67 to a mass repository such as repository 29 of FIG. 1, for the purpose of storing and retrieving summary data, templates, presentation directives, and so on. Gatherer agent 67 may also access data through interface 89 such as profile information, user account and URL information, stored site logics and so on. Data scanned from the WEB is stored in a canonical format in a database such as repository 29, or in another connected storage facility. All stored data is, of course, associated with an individual who requested it, or for whom the data is made available according to enterprise discretion.

A summarization page module 91 is provided and adapted to organize and serve a WEB summary page to a user. Module 91, in some embodiments, may immediately push a WEB summary to a user, or module 91 may store such summarized pages for a user to access via a pull method, in which case a notification may be sent to the user alerting him of the summary page availability. Summarization module 91 includes an HTML renderer that is able to format data into HTML format for WEB page display. In this way, e-mail messages and the like may be presented as HTML text on a user's summarization page. Moreover, any summary data from any site may include an embedded hyperlink to that site. In this way, a user looking at an e-mail text in HTML may click on it and launch the appropriate e-mail program. Other sites will, by default, be linked through the summary page.

Many users will access their summary data through a WEB page as described above, however, this is not required in order to practice the present invention. In some embodiments, users will want their summary information formatted and delivered to one of a variety of Internet-capable appliances such as a palm top or, perhaps a cell phone. To this end, the renderer is capable of formatting and presenting the summary data into a number of formats specific to alternative devices. Examples of different known formats include, but are not limited to XML, plain text, VoxML, HDML, audio, video, and so on.

In a preferred embodiment of the present invention, gather 67 is flexible in such a way as it may act according to enterprise rules, client directives, or a combination of the two. For example, if a user makes a request for summary data about a user/subscribed WEB page to be periodically executed and presented in the form of a HTML document, then gather 67 would automatically access and analyze the required internal information and user provided information to formulate a directive. Using scripting module 79, a knowledge worker provides a template (if one is not already created for that site)

that contains the "where to go" and "what to get" information according to site logic, user input, and known information.

Alternatively, if a user requests a summary about data on one of his sites such as, perhaps, current interest rates and re-finance costs at his mortgage site, the service may at its own discretion provide an additional unsolicited summary from an alternate mortgage site for comparison. This type of summarization would be designed to enhance a user's position based on his profile information. In this case, updated data about latest interest rates, stock performances, car prices, airline ticket discounts, and so on would be stored by the service for comparative purposes. If a user request for a summary can be equaled or bettered in terms of any advantage to the user, such summary data may be included.

In many cases, created templates may be re-used unless a WEB site changes its site logic parameters, in which case, the new logic must be accessed and any existing templates must be updated, or a new template may be created for the site. The templates contain site-specific script obtained from the site and stored by the knowledge workers. In one embodiment companies hosting WEB pages automatically provide their site logics and any logic updates to the service by virtue of an agreement between the service and the WEB hosts.

In an alternative embodiment gatherer 67 may be implemented as a client application installed on a user's PC. In this embodiment, a user would not be required to supply log-in or password codes. Summarization scripts may be sent to the client software and templates may be automatically created with the appropriate scripts using log-in and password information encrypted and stored locally on the user's machine.

In addition to providing WEB summary information, gatherer 67 may also be used to provide such as automatic registration to new sites, and for updating old registration information to existing sites. For example, if a user whishes to subscribe, or register at a new site, only the identification of the site is required from the user as long as his pertinent information has not changed. If a new password or the like is required, gatherer 67 through control module 73 may present login or password codes from a list of alternative codes provided by a user. In another embodiment, a database (not shown) containing a wealth of password options may be accessed by gatherer 67 for the purpose of trying different passwords until one is accepted by the site. Once a password or log-in code is accepted, it may be sent to a user and stored in his password list and at the network level.

It will be apparent to one with skill in the art that a software application such as gatherer 67 may be implemented in many separate locations connected in a data network. For example, a plurality of gatherer applications may be distributed over many separate servers linked to one or more mass repositories. Client applications include but are not limited to a WEB-browser plug-in for communicating to the service. Plug-in extensions may also be afforded to proxy servers so that auto-login and data access may still be performed transparent to a user.

In another embodiment, plug-ins enabling communication with gatherer 67 may be provided and configured to run on other network devices for the purpose of enabling such a device to initiate a request and get a response without the need for a desktop computer.

In most embodiments a user operating a desktop PC will order a one time or periodic summary related to some or all of his subscribed WEB sites. A logical flow of an exemplary request/response interaction is provided below.

Figure 5:
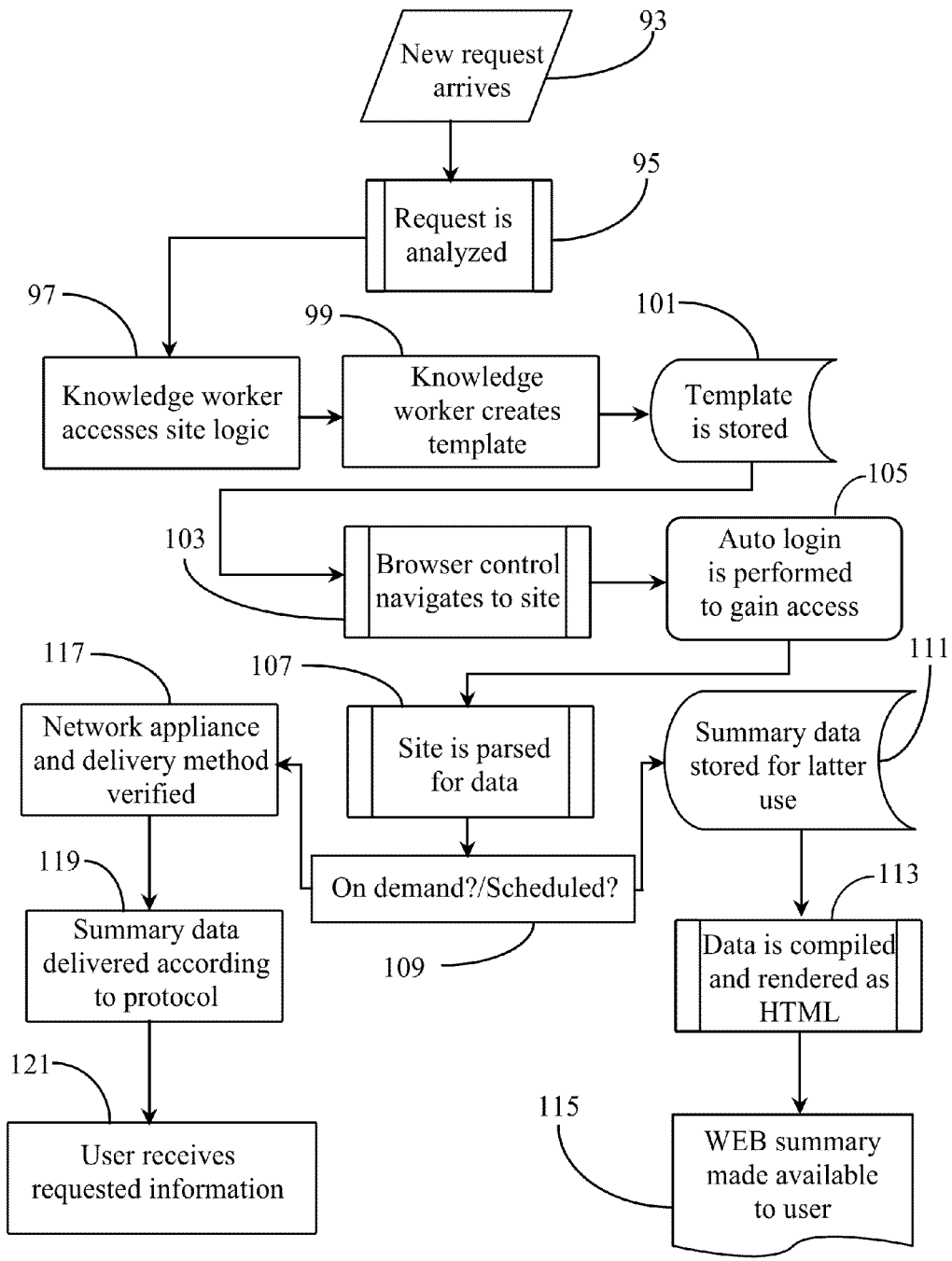
FIG. 5 is a logical flow chart illustrating an exemplary summarization process performed by the software agent of FIG. 4 operating in a user-defined mode.

FIG. 5 is a logical flow chart illustrating an exemplary summarization process performed by the software agent of FIG. 4 operating in a user-defined mode. In step 93, a user has initiated a new request for a summary (summary order). It is assumed for the purpose of discussion, that the request of step 93 involves a site wherein no template has been created. In step 95, the request is received and analyzed. A knowledge worker will likely perform this step. The new request may be posted to the user's portal home page, sent directly to gatherer 67, or even communicated through e-mail or other media to the service.

In step 97 a knowledge worker accesses particular site logic associated with the request URLs. For example, if the request involves a plurality of URLs, then all site logics for those URLs are accessed. Logic may be available in a repository such as repository 29 of FIG. 1 if they were obtained at the time of user registration to a particular URL, or sent in by WEB-site hosts shortly after registration. If it is a completely new URL, then the logic must be obtained from the site. In most cases however, the logic will be known by virtue of a plurality of users accessing common URLs. Therefore cross-linking in a database of logic/user associations may be performed to access a logic for a site that is new to one particular user, but not new to another.

In step 99, the knowledge worker creates a template by virtue of scripting module 79 (FIG. 4) containing all site logic, URLs, log-in and password information, and the user request information. As described previously, templates may be re-used for a same request. In most cases, scripting may be mostly automated with minimum manual input performed by the knowledge worker. In many cases, an existing template will match a new request exactly, and may be re-used. In that case steps 97, 99, and 101 would not be required.

In step 101 the template is stored and associated with the requesting user. The stored template may now be retrieved at a scheduled time for performing the summary gathering. At step 103, a browser control such as module 85 of FIG. 4 is activated to access the stored template and navigate to specified URLs for the purpose of gathering summary data. If a timing function is attributed to the template stored in step 101, then the template may self execute and call up the browser function. In another embodiment, the knowledge worker may notify the browser control to get the template for its next task. In some embodiments, a plurality of controls may be used with one template as previously described.

In step 105, automatic log-in is performed, if required, to gain access to each specified URL. In step 107, a specified WEB-page is navigated to and parsed for requested data according to the logic on the template. If there are a plurality of WEB—pages to parse, then this step is repeated for the number of pages. A variety of parsing engines may be used for this process such as an IE™ parser, or a Pearl™ parser. Only the requested data is kept in step 107.

A request may be an on-demand request requiring immediate return, or a scheduled request wherein data may be posted. At step 109, such logic is confirmed. If the data is to be presented according to a periodic schedule, then summary data parsed in step 107 is stored for latter use in step 111. In step 113, the summary data is rendered as HTML if not already formatted, and displayed in the form of a summary WEB-page in step 115. The summary page may be posted for access by a user at a time convenient to the user (pull), or may be pushed as a WEB-page to the user and be made to automatically display on the user's PC. Notification of summary page availability may also be sent to a user to alert him of completion of order.

If the summary data is from a one-time on-demand request and required immediately by a user, then a network appliance and data delivery method (configured by the user) is confirmed, and the data is rendered in the appropriate format for delivery and display in step 117. In step 119, the summary data is delivered according to protocol to a user's designated appliance. In step 121 a user receives requested information in the appropriate format.

It will be apparent to one with skill in the art that there may be more or fewer logical steps as well as added sub-steps than are illustrated in this example. For example, step 105 may in other embodiments include sub-steps such as getting an encryption key from a user. In still another embodiment, part of a request may be rendered as HTML as in step 113 while certain other portions of the same request data might be rendered in another format and delivered via alternative methods. There are many possibilities.

The method and apparatus of the present invention may be used to present summaries to users without user input. Process logic such as this is detailed below.

Figure 6:
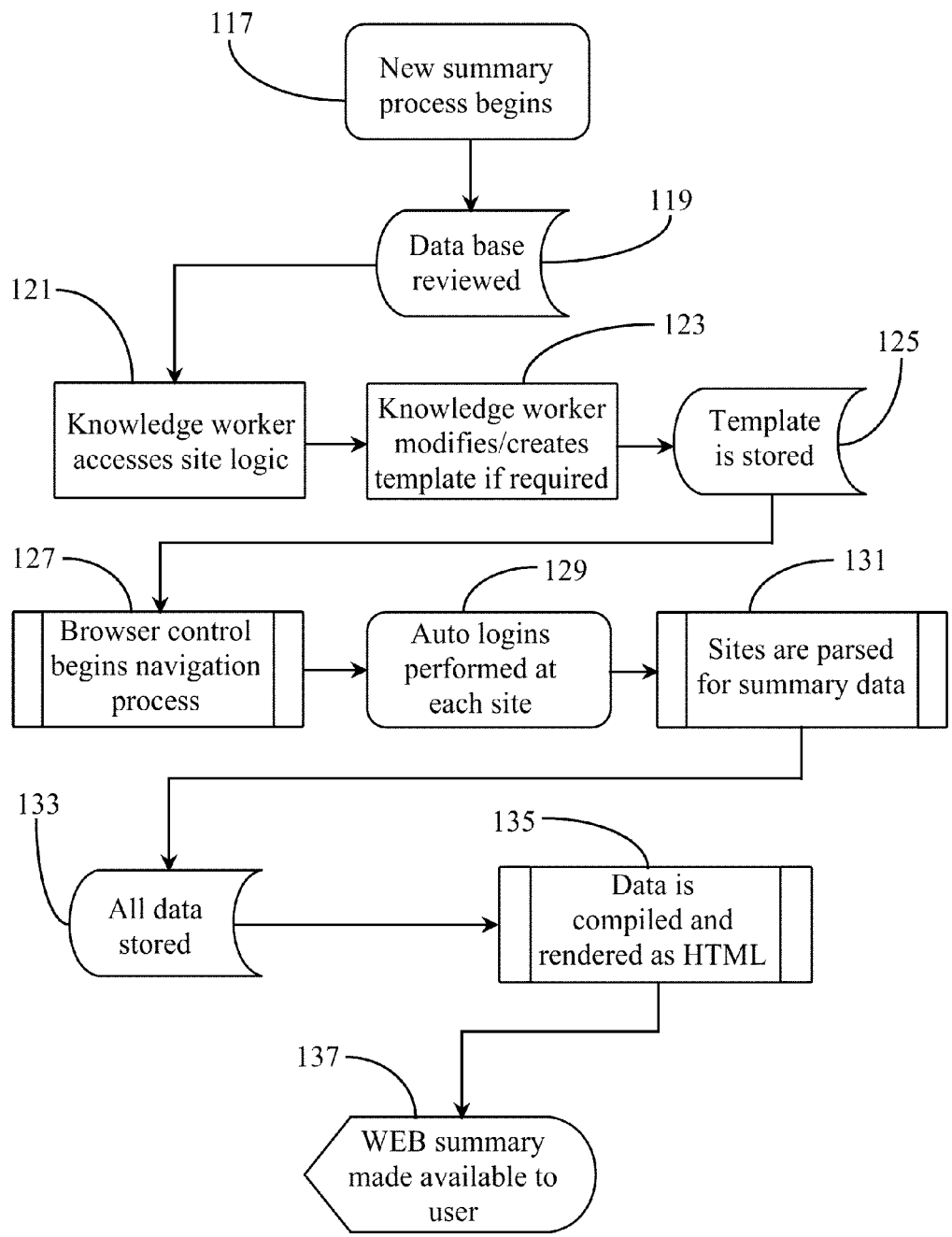
FIG. 6 is a logical flow chart illustrating an exemplary summarization process performed by the software agent of FIG. 4 in a User-independent smart mode with minimum user input.

FIG. 6 is a logical flow chart illustrating an exemplary summarization process performed by the software agent of FIG. 4 in a User-independent smart mode with minimum or no user input. In step 117 an enterprise-initiated summary process begins. In this case, the enterprise may be assisting a user in finding a better deal or, perhaps presenting the individual with summaries from and links to alternative pages not yet subscribed to by a user.

In step 119, a database containing user information and parameters is accessed and reviewed. Certain information specific to a user may be required to initiate an enterprise-sponsored summary report. At step 121, the knowledge worker accesses the site logic specific to the specified target site or sites for summarization. In step 123, the knowledge worker modifies an existing user template, or creates a new one if necessary. At step 125 the template is stored in a repository such as repository 29 and associated with the user.

As described in FIG. 5, the template either self-executes according to a timed function and invokes a browser control such as control 85 (FIG. 4), or is accessed by control 85 as a result of task notification. In step 127, the browser control begins navigation. Auto logins are performed, if required, in step 129 to gain access to selected sites. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In many other situations, no password or login information is required to obtain general information that is not personal to a client.

In step 131, all sites are parsed for summary data and stored in canonical fashion in step 133. At step 135, the data is compiled and rendered as HTML for presentation on a summary page. In step 137, a WEB summary containing all of the data is made available to a user and the user is notified of its existence.

Providing certain information not requested by a user may aid in enhancing a user's organization of is current business on the WEB. Moreover, unsolicited WEB summaries may provide better opportunities than the current options in the user's profile. Of course, assisting a user in this manner will require that the enterprise (service) have access to the user's profile and existing account and service information with various WEB sites on the user's list. A user may forbid use of a user's personal information, in which case, no enterprise-initiated summaries would be performed unless they are conducted strictly in an offer mode instead of a comparative mode.

The method and apparatus also may be practiced in a language and platform independent manner, and be implemented over a variety of scalable server architectures.

Presenting Meta-Summarized Reports

In another aspect of the present invention, a method is provided largely through unique software wherein summary reports may be ordered and presented to users, the reports reflecting calculated and solution-orientated results. This type of summarizing is termed meta-summarization by the inventors, because it is a summarization over a plurality of data sources. Such a method is described in enabling detail below.

Figure 7:
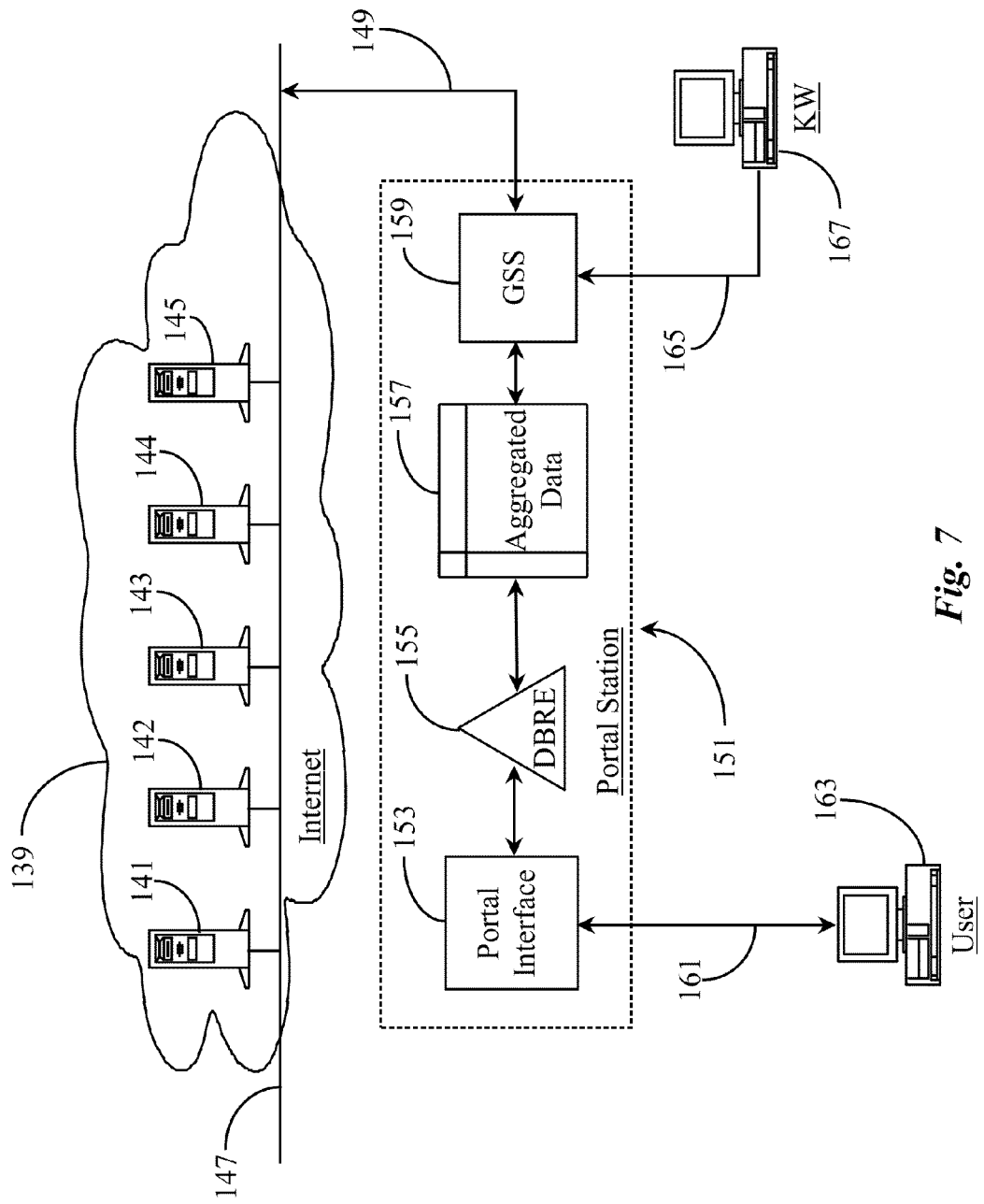
FIG. 7 is an overview of a meta-summarization process according to an embodiment of the present invention.

FIG. 7 is an overview of a meta-summarization process according to an embodiment of the present invention. The term "meta-summary" is used by the inventor in this embodiment also to distinguish the meta-summary process taught herein from the summary process taught above in this specification; in that meta-summarizing involves interpreting and calculating data for reporting a solution-orientated result derived from data retrieved from multiple network sources.

In this embodiment, a portal station 151 is provided and adapted by virtue of software and hardware, to perform WEB-summary and presentation services according to embodiments described in the co-patent applications listed above. Station 151 may be an ISP, a main Internet server, or other network connected server or interface station. In this example, portal station 151 is continuously connected to a source network, which is in this embodiment, the Internet network represented by Internet cloud 139. The above-described network connection is afforded by an Internet-connection line 149 from station 151 to an Internet backbone 147. Internet backbone 147 represents all lines and connections, including sub-nets that make up a global Internet 139.

Portal station 151 has a means provided therein for maintaining a portal interface 153. Portal interface 153 is a file-server interface in this example, however in other embodiments, differing types of network-interface hardware may be substituted therefor. Interface 153 provides hyper-text-transfer protocol (HTTP) pages over an Internet-connection such as path 161 to subscribing users operating such as an illustrated network-adapted PC 163. A user operating PC 163 may go on-line, in this case by such as a dial-up connection, and communicate with portal interface 153 over connection path 161. Connection path 161 may be a normal telephone line, an ISDN line, or another known type of Internet-connection link including wireless connection. A dial-up connection is illustrated herein only as a more common connection method.

A data repository 157 is provided within station 151 and adapted to warehouse aggregated data on behalf of and about a user. Data repository 157 may be part of the same hardware supporting portal interface 153 or it may be a separate hardware implementation connected by a data link. Repository 157 may be of the form of optical storage, or any other known implementation used for storing large amounts of digital data. Repository 157 may be assumed to support varied database programs as may be required to manipulate and organize data or metadata stored therein.

A data gathering sub-system (GSS) 159 is provided within station 151 and is adapted as a software and hardware implementation capable of navigating data-packet networks, such as Internet 139, upon instruction. GSS 159 represents automated browser control/navigation as described in co-pending patent application Ser. No. 09/523,598. GSS 159 is analogous to navigation layer 73 described in FIG. 4 above.

A plurality of network-connected data sources represented herein by file/data servers 141-145 are illustrated in Internet 139. Servers 141-145 are user-subscribed servers known to portal station 151. For example, servers 141-145 may represent one user's collective WEB-services for banking and investment. Such options include banking, stock trading, retirement account servers, insurance servers, and so on. It is noted here that servers 141-145 are assumed to represent separate WEB-based services subscribed to by one user and are not affiliated with one another. For example, a user operating such as PC 163 would do all of his on-line banking, trading, and investing using servers 141-145 in this example.

In another embodiment, servers 141-145 may represent all of a user's frequented on-line shopping services. The fact that all of servers 141-145 are topically related but not affiliated with one another in this example serves only to aid in explanation of the present invention as will be seen below.

It is taught in the co-pending patent application entitled "Method and Apparatus for Obtaining and Presenting WEB Summaries to Users" that site navigation, parsing data, and returning data to users or storage is enabled, in part, by site-logic templates provided typically by knowledge workers. This aspect is represented herein by a PC 167 adapted for a knowledge worker (KW). A KW working from a station such as PC 167 provides site-logic scripts for navigation to data requested by a user and stored in any one of or all of servers 141-145. Such scripts are provided to GSS 159 over a data link 165. Summary data stored in such as repository 157 is stored for user access. In some cases wherein a user requests immediate data return, data is sent directly to such as portal interface 153 where a user may then access the data immediately.

According to an embodiment of the present invention, a novel database-reporting engine DBRE 155 is provided and adapted to perform formulative processes to aggregated data on behalf of a user. DBRE 155 is in itself a database utility and is in a preferred embodiment a part of the software environment of repository 157. In another embodiment DBRE 155 may be part of the software environment of portal interface 153.

In this embodiment, DBRE 155 acts as a first "gathering agent" and checks repository 157 first for user requested data upon request. User-history records of all user transactions at all of his registered WEB-based services are preferably maintained in repository 157 and are accessible to DBRE 155. In some cases, services such as those represented by servers 141-145 may provided complete transaction histories that may be obtained and stored in repository 157 and updated periodically. In some cases however, such services may not retain history records for users. In this case, a user accessing such services through his or her portal interface 153 may track each transaction over a normal course of time resulting in a history record for transactions at that service that is maintained in repository 157.

In the case of servers 141-145, each contains some form of financial portfolio data connected to one user. For example, server 141 may represent a banking service where a user has a savings account. Server 142 may represent a banking service where the user has a checking account. Server 143 may represent an on-line investment company maintaining a fast-changing portfolio of investments and losses for the particular user. Server 144 may represent a banking company where the user has an individual retirement account (IRA). Server 145 may represent a mortgage company holding data about the users property portfolios. Each site presumably holds current account-status information and a financial history of transactions performed by a particular user.

To illustrate, assume that all financial data particular to one user is provided by or obtained from servers 141-145, aggregated in data repository 157, and updated periodically. A user operating PC 163 may access portal interface 153 by way of Internet connection 161 and request a specific result that involves some or all of the data across multiple servers 141-145. One example would be a user-initiated command "calculate my current net-worth". The resulting meta-summarized report would inform a user of his or her calculated net-worth with all financial data from all financial data-sources (servers 141-145) analyzed in the process of answering the user query.

In this case DBRE 155 utilizes only data that is already aggregated in repository 157. Therefore, it is not specifically required that GSS 159 navigate on behalf of the user in a case where data held in aggregation is current and sufficient to satisfy a user request. However, if a user's particular request, such as the one stated in the above example, requires navigation to one or more of servers 141-145, GSS 159, using site logic provided by KW 167, would navigate to each required site and retrieve the required data. After the required data is aggregated in repository 157, DBRE 155 may analyze the aggregated data and generate an accurate report from the aggregated data based on a user's request.

It will be apparent to one with skill in the art that providing a unique engine such as DBRE 155 on a user-side of repository 157 saves precious bandwidth resource required by individual site navigation and return of data ordered by a user. Added storage space is required in repository 157 for the purpose of storing complete activity histories from multiple WEB services on behalf of users. However, adding such resource and saving bandwidth represents an intelligent implementation in light of the many techniques known in the art for compressing and archiving data. More detail about the function of DBRE 155 is presented below.

Figure 8:
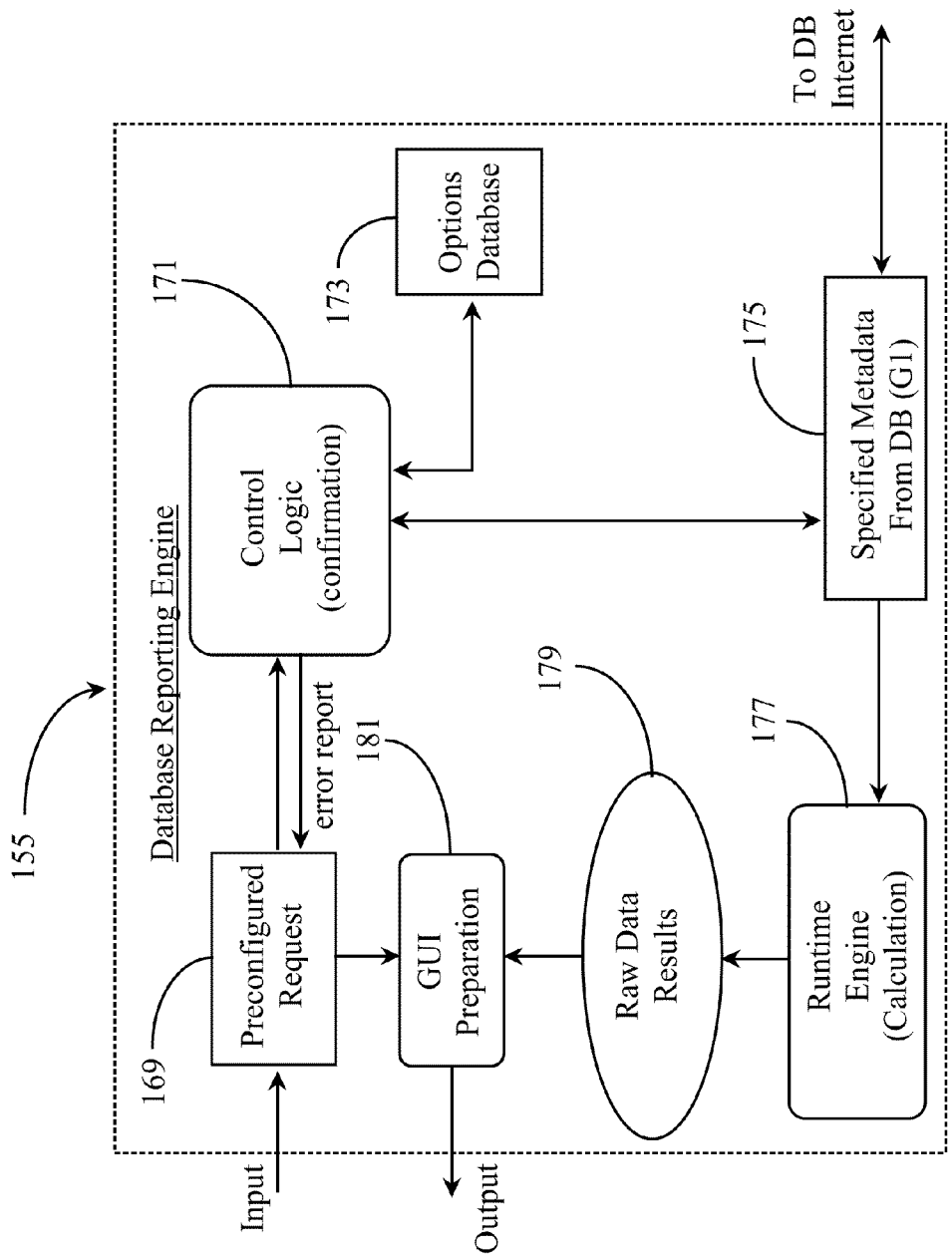
FIG. 8 is a block diagram illustrating components and functions of the database-reporting engine of FIG. 7 according to an embodiment of the present invention.

FIG. 8 is a block diagram illustrating additional detail, components and functions of DBRE 155 of FIG. 7 according to an embodiment of the present invention. DBRE 155 is a functional interface capable of obtaining, analyzing, and preparing data for presentation to a user. As such, it contains certain sub-modules responsible for performing certain required functions. For example, a control-logic module 171 is provided as part of DBRE 155 and adapted to parse and confirm a user's request as well as to insure that a user-selected presentation format is available and appropriate for the type of data result requested by a user. Such options are contained in an options database 173 illustrated as connected to control module 171 by a double arrow representing bi-directional communication.

Options database 173 may be part of DBRE 155 as illustrated herein, or part of repository 157 and made accessible to DBRE 155. In the case of DBRE 155 maintaining its own databases such as options database 173, and a previously described database containing user histories across multiple accounts, then DBRE 155 would be resident in a machine having enough storage memory to hold all required data. Such a machine could be a processor/server. In another embodiment, all stored data is held in repository 157.

DBRE 155 also has a runtime engine 177, which performs data analyzing and calculation in order to form specific data results or solutions for users based on user request. Engine 177 has access to all of the mathematical tools and system knowledge required to perform its objectives which can vary considerably. A knowledge base (not shown) may be used as a source of intelligence for engine 177 as is generally known in the art of configuration models.

Engine 177 performs a wide variety of mathematical functions including such as statistical analysis, summing, averaging, and so on. In one embodiment algebraic, geometric, and trigonometric functions are also provided for performing more complex calculations. In most cases however, user requests will be geared more toward averaging, summing, predicting probabilities, deriving percentages, and so on. For example, summing multiple bank balances would be a common task. Analyzing on-line spending trends across multiple on-line shopping services would be another example of a common task. A more complicated report might compare shopping trends with income potential and produce a ratio figure along with recommended ways to improve on the ratio without sacrificing needed goods. There are many possibilities.

A graphics user interface (GUI) module 181 is provided within DBRE 155 and adapted to prepare data according to requested format and a requesting display type. GUI module 181 has knowledge of which presentation option was selected from options database 173, and knowledge of the parameters (hardware and software platform) of a particular device or station that will receive a report. It is not required that a report be directed back to an originating device. In some embodiments, a user may direct a meta-summary report to alternative receiving devices over different mediums. This assumes, of course, that the receiving devices and data networks are known to the system.

In practice of the present invention, a user initiates a request illustrated herein as an arrow labeled input to a pre-configured request 169 from such as his or her browser interface. Request 169 is parsed for meaning in control-logic module 171. If there is an error detected in the original request 169, such as missing information or an option selection that is not available, then an error report is immediately sent back to that user as illustrated by the arrow labeled error report. Control-logic module 171 may check options database 173 to determine if an unavailable option was selected and present an alternative available option back with the error report.

Once module 171 has confirmed a request and confirmed a presentation option, it accesses a guard (GI) 175 resident on the client side of such as repository 157 of FIG. 7 to see if there is enough current data stored therein to enable formulation of a valid result. Data obtained from repository 157 of FIG. 1 by way of database interaction is included in guard 175 and passed to engine 177 for processing. If however, a required portion of data is missing from repository 155, GSS 159 of FIG. 7 may be invoked to retrieve the requested data. An error message may, in this case, be sent back to a user informing him of a requirement to navigate for a portion of required data.

All of the data required to return a requested report is funneled into runtime engine 177. All of the appropriate calculations are performed and the resulting data illustrated herein as raw data-results 177 is passed into GUI module 181. GUI module 181 then prepares the result data for presentation to a user illustrated herein as an arrow labeled output.

As described above, a report may be very simple or quite complex, including text and graphical elements as well. In one embodiment all of the process steps performed on included data may be broken down and reported to a user along with a final result. Presentation options may include spreadsheets, graphs, text reports, pie charts, and so on.

In the example presented above, DBRE 155 is a multifunctional module that may be broken down into cooperating sub-modules. However, this is not required to practice the present invention. One with skill in the art will recognize that there are other orders of modules and distribution paths that may be utilized to accomplish the same function. For example, DBRE 155 (FIG. 7) may interface directly with GSS 159 (FIG. 7) instead of being enhanced for gathering from aggregated data. In this case GSS 159 would first check repository 157 before determining if navigation is required. In another embodiment navigation may be required by default to insure that all data in aggregation is current. There are many possibilities.

Figure 9:
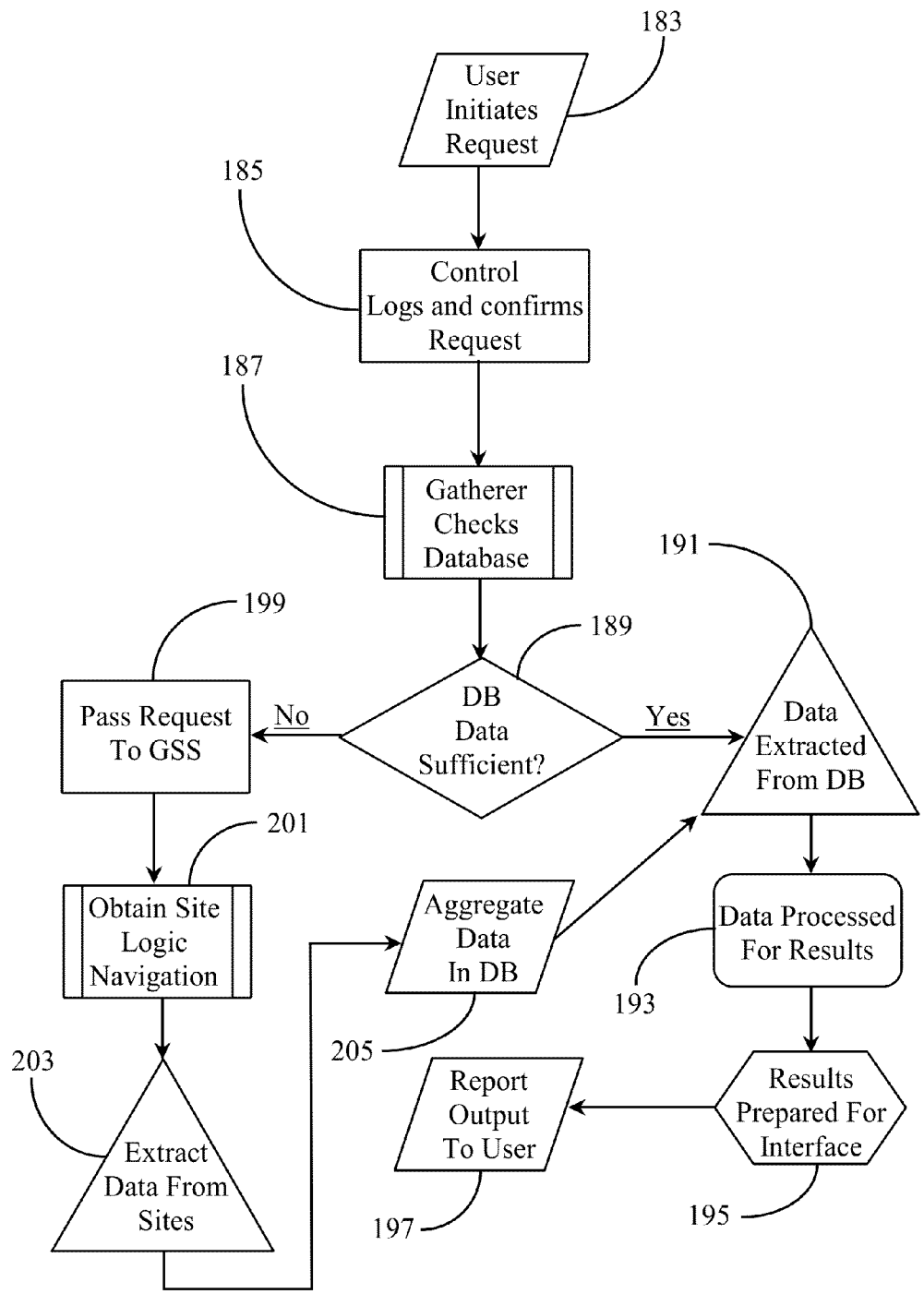
FIG. 9 is a process flow diagram illustrating logical user and system steps for initialization to completion of a meta-summarized report according to an embodiment of the present invention.

FIG. 9 is a process flow diagram illustrating logical user and system steps from initialization to completion of a meta-summarized report according to an embodiment of the present invention. At step 183, a user initiates a meta-summary report request from such as PC 163 of FIG. 7 using a browser/portal interface. A request might be to sum all of my interest earnings from all of my interest bearing accounts over a 1-year period and return a monthly average. In a preferred embodiment such a request may be made in a "natural language" understood by the portal software.

At step 185, control logic registers and confirms feasibility of the original request. This step includes parsing the request, confirming a presentation option, confirming presentation delivery parameters (software, hardware, medium) and so on. Once a request is approved for action, a data gatherer at step 187 accesses the database, such as in repository 157 (FIG. 7) for required data. Such a gatherer, termed a bot by the inventor, may be part of DBRE 155 as illustrated in FIG. 8, or part of GSS 159 of FIG. 7.

At step 189 it is determined whether or not there is sufficient data available in aggregation to complete the request. If the decision is yes, then the required data is extracted from the database (DB) in step 191. At step 193 the extracted data is processed according to tools that accomplish the user's request, which is a solution-orientated result. Text records of processing may also be forwarded to a user if requested. In this way a user might review several steps taken to arrive at a solution-oriented result.

At step 193, the raw result data is prepared according to user-requested presentation options in such as GUI module 181 of FIG. 8. A presentation option may consist of simple text results appearing on a user's portal home page. In one embodiment a separate WEB page may be constructed that displays varied versions of the same result such as a time chart, a text paragraph explaining the chart, and a table reflecting result values. A meta-summary dealing with an averaged interest rate, as described in an example above, may be presented in a variety of ways. For example, each account and individual result may be listed, followed by a summed result over a particular time span, followed by an average figure over a smaller increment of time. There are no limits to presentation possibilities as long as the appropriate software containers are supported at both ends of the interaction. In most cases, a browser interface supporting full interactive function will be utilized. In step 197, the prepared GUI data is sent to a requesting user such as one operating PC 163 of FIG. 7 over an Internet connection such as connection 161. It should be noted here again that many devices are capable of effecting an interface with DBRE 155 of FIG. 8 and receiving result data. The success of configuring varied devices to the system will depend on provided network and data interfaces.

If in step 189 it is determined that there is not enough data or the right kind of data already in aggregation to complete a request, then the request is passed over to a GSS, such as GSS 159 of FIG. 7 in step 199. In one embodiment gathering is the sole responsibility of GSS 159 as has already been described. In step 201 site logic templates are obtained from such as a KW operating a PC such as PC 167 of FIG. 7. If the navigation templates required are the same as templates that have been previously used, then such templates may be obtained from a connected data store.

At step 203, a GSS such as GSS 159 of FIG. 8 navigates to and extracts data from required WEB sites in order to complete the aggregated data store on behalf of the requesting user. At step 205, the data is passed into aggregation in a database assigned for the purpose in such as repository 157. After all of the required data has been aggregated in step 205, steps 191 through 197 are repeated.

It will be apparent to one with skill in the art that the process steps described above represent a mostly automated or completely automated process. Moreover, there may be other sub-routines added without departing from the spirit and scope of the present invention such as adding a user notification step in the event that in step 189, data is insufficient.

It will also be apparent to one with skill in the art that a process routine such as the one described herein may be altered according to an alternate operating environment without departing from the spirit and scope of the present invention. For example, if a user is interfacing from a wireless device through such as a data center network interface, then added steps may be required to convert data to a format understood on a different network. There are many diverse applications.

Figure 10:
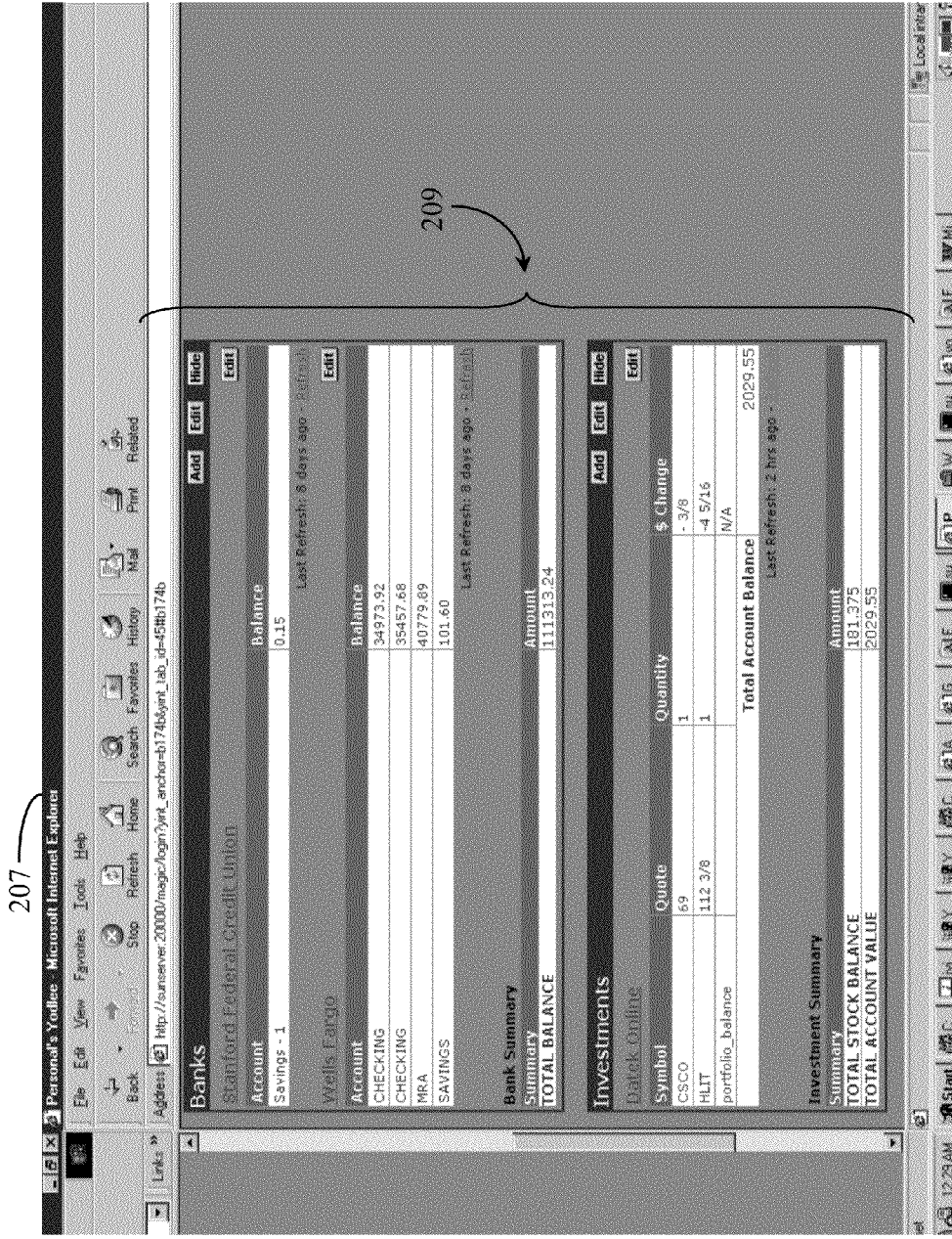
FIG. 10 is a representative view actual screen shot of a meta-summarized report on display in a user's browser interface according to an embodiment of the present invention.

FIG. 10 is a representative view of an actual screen shot 207 of a meta-summarized report 209 on display in a user's browser interface according to an embodiment of the present invention. In a more common implementation of the present invention, a user interfaces with such as a portal server by utilizing a common browser interface, many brands of which are known in the art and readily available. In this particular example, a Microsoft™ browser application known as the Internet Explorer™ (IE) is used. However the system of the present invention works with any software interface capable of navigating a data packet network.

Summary report 209 consists of individual bank, investment and account listings complete with the names of the institutions. Summaries of the individually reported information for both bank accounts and stock accounts are found beneath each group listing. Report 209 is a rather simplified example of many graphical possibilities and presentation methods. Depending on the complexity of a request, a meta-summarized report may contain virtually any type of presentation mediums. Some examples include, but the invention is not limited to limited to, Gant charts, time graphs, pie charts, flow charts, text summaries, and so on. In another embodiment, a summarized report may contain interactive options for looking at the same data in different ways, or even calculating further results from the results presented. A user has many options when accomplishing interface with the system of the present invention through a fully functional browser application installed on a powerful PC. Interface through other devices such as personal digital assistant's, cellular telephones, and the like will obviously limit presentation options, however, the use of such devices for interface is possible and may, in some situations, be preferred. Such situations may be business meetings, interviews, and other situations wherein a user may need to access some summary data, but does not have access to his personal computer station. Moreover, such data may be previously ordered and sent to a place other than at his or her personal computer. With appropriate interface to telephony networks, such information may, if directed by a user, be faxed to a meeting place, e-mailed to an associate's e-mail address, and so on. There are many diverse applications, many of which have already been stated.

Personalized Recommendations

In another aspect of the present invention, a means is provided for gathering data from multiple user sites and using the data to provide an intelligent recommendation to a user regarding an impending user activity. Such a means is described in enabling detail below.

Figure 11:
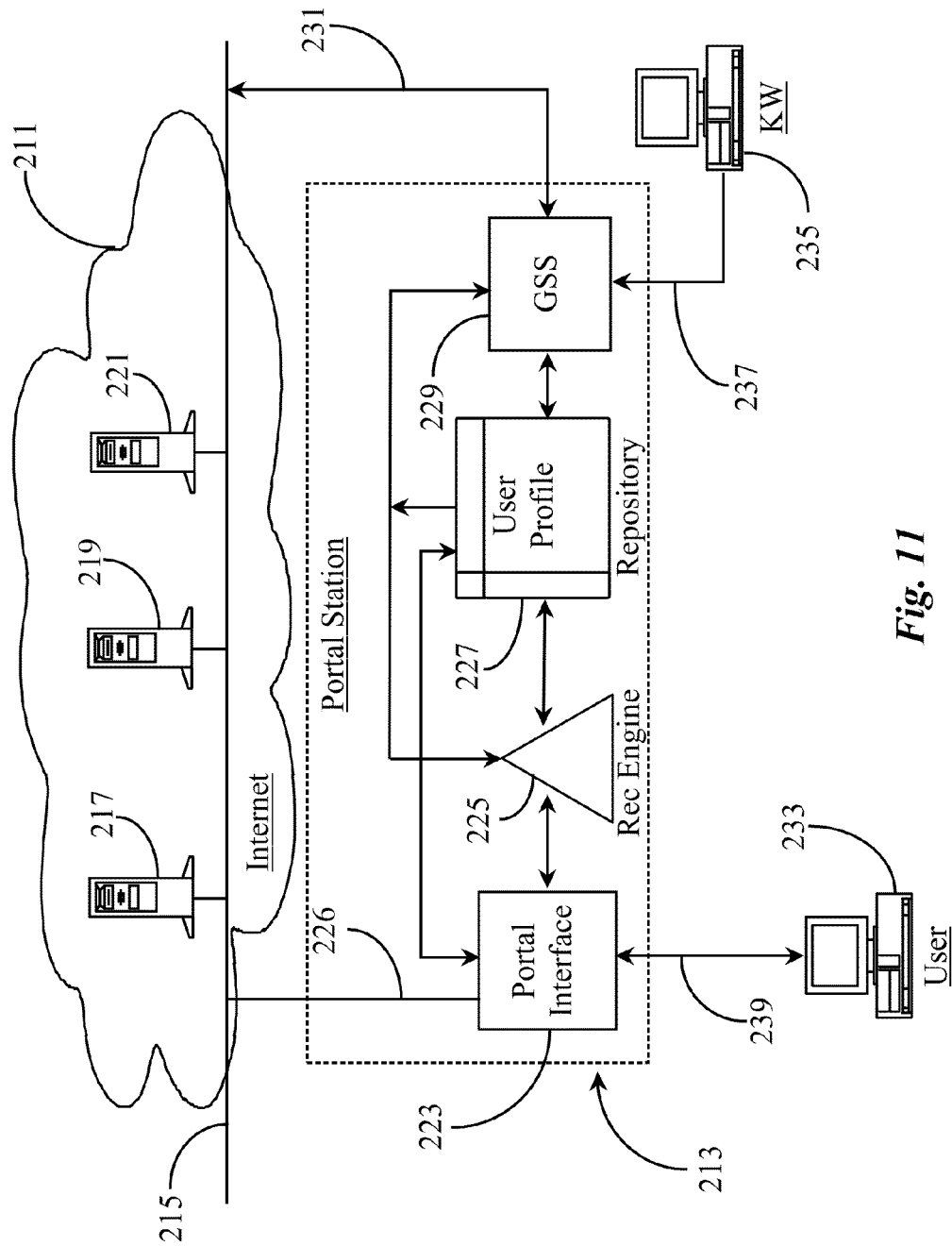
FIG. 11 is an overview of a personalized recommendation system according to an embodiment of the present invention.

FIG. 11 is an overview of a personalized recommendation system according to an embodiment of the present invention. In a preferred embodiment, a recommendation system is provided and adapted to provide advice concerning user-initiated purchases and other online activities. Such a recommendation system is integrated with architecture and software environments that have been described with reference to co-related patent applications described in the cross-reference to related documents section. Therefore, several components described herein will be analogous to previously described components although they may be given new element numbers.

In this example, a wide-area network (WAN) 211, which in this case is the well-known Internet, is connected to a portal station 213 preferably by way of a continuous Internet connection path 231. Connection parth 231 is adapted to enable automated data gathering on behalf of users by system components as will be described further below. Connection path 231 is connected to an Internet backbone 215, which represents all of the lines and interconnections making up the global Internet 211. Shown connected to backbone 215 are file servers 217, 219, and 221. Servers 217-221 represent WEB services that are subscribed to by a user practicing the present invention. Such services may represent travel services, banking services, shopping services, and the like.

Internet 211 may be another type of WAN such as a corporate or a private WAN without departing from the spirit and scope of the present invention. The inventor chooses to illustrate Internet 211 herein solely because of the wide public-access availability afforded.

Internet-portal station 213 comprises all of the equipment and components to enable WEB-based data gathering and summary return as discussed in co-related patent applications listed above. As such, station 213 may be implemented at an ISP location, as a standalone center, or distributed in Internet 211. In this particular example, station 213 can be assumed to be a stand-alone center hosted by a company providing various WEB-gathering services.

A portal interface 223 is provided within portal station 213 and adapted as an interface to users subscribing to the service of the present invention. Interface 223 is, in a preferred embodiment, a file server adapted as a portal and task interface for user's doing business online with their registered sites. A mass-storage data repository 227 is provided within portal station 213 and stores data about users subscribing to the service and data comprising aggregated information obtained from user-frequented WEB services represented by servers 217-211, which are accessible through Internet 211.

Repository 227 may be an online or off-line facility of any form capable of storing the required data and providing interface through appropriate database software for the purpose of accessing and manipulating such data according to enterprise rules. For example, user profile information including a list of registered WEB-services is provided and stored in repository 227 as described with reference to application Ser. No. 09/208,740 entitled "Method and Apparatus for Providing and Maintaining a User-Interactive Portal System Accessible via Internet or other Switched-Packet-Network". In addition to user profile information, data collected from user services is aggregated on behalf of users and stored on a user-directed basis. Such data is obtained from various WEB sites subscribed to by such users.

An exemplary user, illustrated herein as a PC icon labeled with element number 233, establishes connection with portal interface 223 over an Internet access path 239. Access path 239 may be a normal telephone line such as with a modem/ dial-up connection. In other embodiments, ISDN lines, cable/modem connections, or wireless connections may be used. User 233 uses his browser interface to interact with the portal system supported by portal station 213. In turn, portal interface 223 has an Internet connection path 226 adapted for direct and automated browsing through interface 223 by proxy (system components).

In this embodiment, a service enhancement that allows a user to obtain an intelligent purchase or other type of recommendation regarding an impending activity is illustrated herein by inclusion of a recommendation engine 225 (largely a software component), and a gathering-sub-system (GSS) 229 provided within portal station 213. GSS 229 is a system of software components adapted to navigate to user-frequented sites by way of system architecture and obtain data from various WEB sites for aggregation in repository 227 associated with individual users, and eventual presentation to requesting users. GSS 229 is analogous to GSS 159 of FIG. 7 and includes such as automated browser controls and software agents, termed bots by the inventors, that are capable of parsing and obtaining data from WEB-sites among other functions. Disclosure pertaining to hardware used to implement GSS 229 is available in the co-related specification Ser. No. 09/362,914 entitled "scalable Architecture for Distributed Job Processing".

A knowledge worker (KW) illustrated herein as a PC icon labeled with element number 235 is provided for the purpose of supplying site-logic templates to GSS 229 for navigation purposes. KW 235 is connected to GSS 229 by a data link 237, which may be a LAN or WAN connection. Site-logic templates that may be re-used are stored in such as repository 227 along with user profile data and aggregated data.

In this example, a user wishes to make a decision regarding an impending activity, which he or she will execute regarding one of WEB-servers 217-221. Such an activity may be, for example, to purchase an airline ticket, in which case servers 217-221 might represent separate travel services through which such tickets may be purchased, including sites specific to major airlines. If the activity involves such as using a credit card to pay for a service or product, then servers 217-221 would represent separate WEB services through which user 233 has obtained and maintains an active credit account.

There are two methods by which a system recommendation may be initiated on behalf of a user, through engine 225. A first method is through a query initiated by a user, such as user 233, through his or her browser interface. A second method involves automatic system monitoring of a user's activity and automatically initiating a recommendation based on detection of a user's activity.

Referring first to the second method stated above, assume that user 233 is online and actively browsing, connected to server 221 of WEB services 217-221 through interface 223. In this case, Web servers 217 and 219 may be credit-card-account servers and server 221 may be an online shopping service. If user 233, while browsing shopping pages held in server 221 clicks on an item for immediate purchase with a credit card, then a decision must be made by user 233 concerning which of two cards (servers 217 and 219) to use for the purchase at server 221.

In the above example engine 225 monitors the online activity of user 233 is so that interface 223 is aware of the impending purchase. It will be apparent that this function may be provided by software executing anywhere on portal station 213. The system thus recognizes when a user has activated a buy link on any WEB page he is currently browsing. Therefore, when a user activates such a purchase link, interface 223 automatically initiates a recommendation process, which in this case, will be what card to use for payment.

Assuming that a purchase link has been activated according to the parameters described above, then interface 223 immediately contacts repository 227 (illustrated by a bracketed double-arrow connection) to see if the service that the user is buying from requires a credit card. If so, then interface 233 looks for registered credit-account services through which user 233 has one or more cards. If there are more than one, such as is the case herein with services 217 and 219, then interface 233 activates recommendation engine 225 (illustrated by a straight double-arrow connection). A system notification may be sent to user 233 in the form of an audible alert or screen pop asking him or her to pause momentarily while a recommendation is prepared. There may also be a choice presented to user 233 of whether or not to continue with a recommendation.

If all of the required information is already entered into repository 227 in the form of updated and aggregated data, then recommendation engine 225 may simply pull the required data from repository 227 (illustrated by straight double arrow connection) and compile a recommendation report without activating GSS 229. Required information may include interest rate, account balance, accumulated bonus points for repeated card use, and any other company policy information that may be connected to enhancing user convenience through use of a card.

If navigation is required to obtain data from sites 217 and/or 219 in order to complete an intelligent recommendation, then engine 225 activates GSS 229 (illustrated by a bracketed double-arrow connection) with a command-order to navigate and update data. A specific data request is supplied to GSS 229 and becomes part of the site-logic template used to navigate to servers 217 and/or 219. Such templates may already exist due to repeated recommendations and navigation to sites. KW 235 may (if required) provide a new template incorporating the information supplied by engine 225. In most cases the process can be completely automated.

In this case GSS 229 navigates to site 217 and/or site 219 on behalf of user 233 by way of Internet connection line 231 and obtains the required data. GSS 229 then aggregates the data into repository 227 (illustrated by a straight single-arrow connection) and passes same data to recommendation engine 225 for comparison.

Recommendation engine 225 has all of the required tools needed for data processing and comparison as well as tools for preparing a recommendation report for a user such as user 233. Engine 225 passes a complete recommendation to interface 223, which forwards the report to user 233 over connection line 239. Such a report may be a text report, an audible report, a graphical report, or a combination thereof. Such a report may appear in a current browser window displaying the target WEB page, or in a side bar area. There are many possibilities. The inventor intends that the entire process should take only at most a few seconds and streamlines the process where possible such as by tapping data already stored if such data is sufficient to provide an intelligent recommendation.

Recommendations made by engine 225 may be of many sorts and based on diverse criteria. If a user is purchasing an item on-line, the system may recommend a credit card based on such criteria as existing balance, interest rate, perks such as frequent-flyer miles, and the like. If the user is buying an airline ticket, the system may recommend an airline based on known user preference for avoiding certain stop-over points and the like. There are many, many possibilities. The first method introduced above is accomplished through user query. In this case, assume a user such as user 233 has intentions of purchasing such as an airline ticket for a pre-scheduled business appointment. However the user does not wish to browse his registered travel services represented in this case by servers 217-221 looking for a deal. Instead, user 233 may enter a query through such a browser interface that reflects his or her intention. For example, a query interface may be personalized to a user and include entry fields for a user to check or click. Such fields may include such as airline tickets, destination, desired time of departure, desired time of arrival, and so on. There may be an additional entry field for listing specific registered services (two or more) or include all services.

When the query is submitted, interface 223 checks repository 227 for listed services as described previously. Recommendation engine 225 is then activated and checks repository 227 for sufficient updated data. If there is enough data to complete an intelligent recommendation, then recommendation engine 225 processes and passes the information to interface 223, which forwards the report to user 233 without requiring navigation. However, it is known that services such as travel agencies and the like update information almost continually. Therefore, it is likely that navigation would be preferred in many cases.

If navigation is in order, then recommendation engine 225 activates GSS 229 with an order to navigate to sites 217, 219, and 221, which represent travel services frequented by user 233. GSS 229 navigates by way of connection path 231 to sites 217, 219, and 221, obtains specified data according to site logic and user directive. GSS 229 passes obtained data to recommendation engine 225 for processing and aggregates the same into repository 227. Engine 225 generates a report based on obtained data and submits the report to interface 223. Interface 223 makes the report accessible to user 233 over connection 239. Such a report may appear on a user's portal home page, or be sent in the form of e-mail or any other supported media and form. In this case, the report would include identification and URL of the service that is best able to serve, the prices and parameters for the available tickets, any reasoning why the selected service is a preferable choice, and so on.

In another embodiment of the present invention, recommendations may be ordered in a piggyback fashion. For example, consider the case of a user such as user 233 submitting a query to obtain a recommendation as to which service he should use. By default, the system may present a second recommendation concerning which credit card should be used to pay for the ticket offered by the recommended travel service.

In still another embodiment, the two described methods may be combined such that some recommendations are always performed by default through monitoring and some may be ordered by query. For example, a user such as user 233 may configure the service to allow a query method to obtain a recommendation such as which service would be more beneficial for purchasing an item. When the user navigates to and activates a recommended purchase, a second default recommendation advises the user how to pay for the purchase. There are many possible combinations.

Recommendation engine 225 obtains its knowledge by system programming such as with the use of a knowledge base. A point system may be used to equate certain parameters. For example, interest rates particular to credit cards, may be equated to points-for-comparison. Other constant factors may be likewise equated. Variable factors (factors that may change frequently) may be summed and compared (if mathematical) and equated. For example, if three separate credit cards are considered, then the card with the lowest balance may earn one point whereas the one with the lowest interest rate may earn 1.5 points and so on.

In a preferred embodiment user's that have special deals or programs associated with thresholds of purchase activity for certain credit cards, bonus programs associated with specific shopping sites or the like may program such personalized information into repository 227 so that the information may be considered and incorporated by recommendation engine 225. Moreover, recommendation engine 225 may be personalized to one user and updated periodically so that the user's current non-standard data is always considered. In this case, a separate knowledge base resource might be provided to each subscribing user.

It will be apparent to one with skill in the art that the method and apparatus of the present invention may be accomplished through user query, by default or a combination thereof. Much of the scope of this specification and those listed in the cross-reference section lends to personalization of services in order to provide enhanced user satisfaction. Therefore, personalization, where possible, is preferred.

Figure 12:
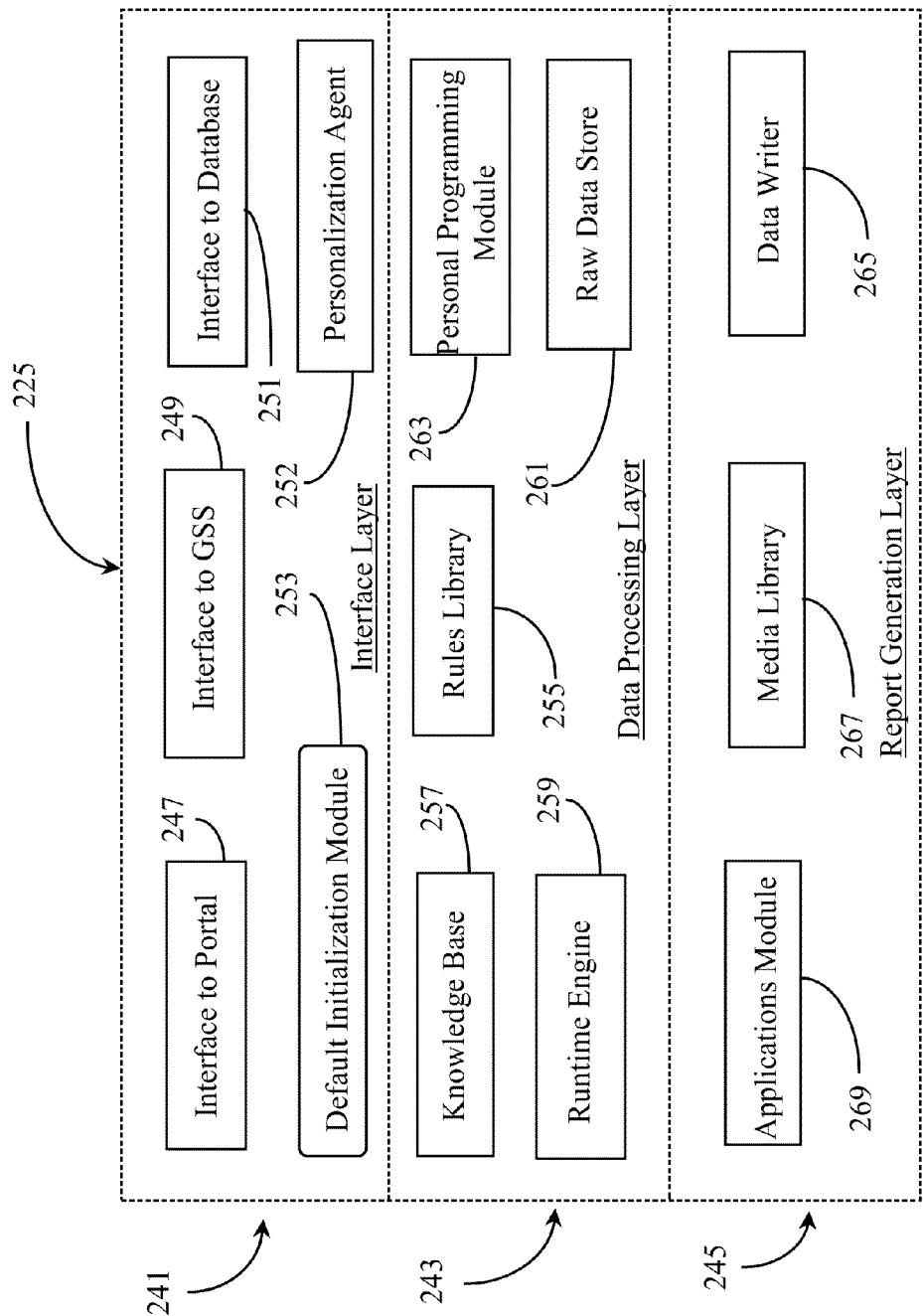
FIG. 12 is a block diagram illustrating components of a purchase recommendation engine according to an embodiment of the present invention.

FIG. 12 is a block diagram illustrating components of purchase recommendation engine 225 according to one embodiment of the present invention. Recommendation engine 225 comprises three functional software layers. These are an Interface layer 241, a data processing layer 243 and a report generation layer 245. As a software implement, engine 225 executes on a machine having a suitable processor for computing and processing data. Such a machine may be a same machine supporting portal interface 223 of FIG. 11, or a separate processor-based machine dedicated to processing recommendation data for clients. As described with reference to FIG. 11, recommendation engine 225 is personalized to each individual as much as possible through programming. That is to say that each individual has his or her own database wherein personal, profiling, and aggregated WEB data is held. Each individuals data is stored centrally such as in repository 227 of FIG. 11.

Interface layer 241 has a portal interface module 247 providing input/output (I/O) communication capability with portal interface 223 of FIG. 11. Engine 225 may be activated through I/O interface 247 and returns completed recommendation data through I/O interface 247. A GSS interface module 249 is provided and adapted to enable I/O data communication capability with GSS 229 of FIG. 11. Module 249 functions in the event that navigation is required to return sufficient data for recommendation processing. A personalization agent module 252 is provided and adapted to issue commands through GSS interface 249 for dispatching of gathering agents or "bots", to navigate on behalf of a client. In one embodiment personalization agent 252 is part of GSS 229 of FIG. 12. An advantage of integrating personalization module 252 into recommendation engine 225 is that module 252 contains logic and built-in intelligence required to personalize bots (gatherers) to perform according to personalized client rules.

A database interface module 251 is provided and adapted to enable I/O communication capability with repository 227 of FIG. 11 using appropriate database software. For example, engine 225 may request access to personal information stored on behalf of any client and receive requested data through the same interface. A default initialization module 253 is provided and adapted to enable automatic initialization of engine 225 based on monitored WEB activity on behalf of any subscribing client. In this sense, module 253 is an input mechanism that accepts the required data for initializing a recommendation return process. Notification to module 253 resulting from WEB activity activates engine 225 and provides all the required data to initialize an automatic recommendation sequence on behalf of the monitored user.

Interface layer 241 accomplishes all of the interface capability of engine 225 to the rest of the system components as described above. Administrative programming of various modules comprising engine 225 may be accomplished through portal interface module 247. In one embodiment a separate programming interface module (not shown) may be provided for administrators or knowledge workers to access and program various modules contained in engine 225.

Data processing layer 243 comprises all of the required modules to enable successful processing of input and acquired data for a recommendation sequence. A programmable rules library (database) 255 is provided and adapted to contain enterprise rules related to general processing parameters. Such rules may also contain special personalized rules that may apply to certain clients. An example of a general rule would be "always initiate secondary recommendations when possible". Such a rule applies to a situation wherein a purchase recommendation is followed by an automatic "method of payment" recommendation or the like. An example of a personalized rule may be an added recommendation routine for client X wherein an automatic "bid ceiling" is recommended every time client X is bidding on an item in an auction based on an average going price for similar items client X has purchased at other auctions.

A programmable knowledge base 257 is provided and adapted to hold system knowledge related to what types of general recommendations are possible using engine 225. For example, if recommendation possibilities include intelligent purchasing of airline tickets, car rentals, books, movies, software, computers, stocks, and the like, then related constants and equaters would be included in knowledge base 247. In a query-based method described in FIG. 11, such options may appear along with the query such that a user may check which options he wishes to perform.

A runtime engine 259 is provided and adapted to equate acquired and input data with constant data in knowledge base 257 according to rules listed in library 255. In one embodiment knowledge base 257 may be personalized for each client such that a particular knowledge base is specific to only one individual. In this way, special recommendation routines may be processed for a particular client that otherwise are not common routines.

A raw data store 261 is provided and adapted to temporarily store all processed data generic to a completed recommendation routine. Data store 261 uses system memory or cache wherein "chunks" of raw data are tagged to requesting clients. A client chunk of data may consist of one or more separate recommendation routines. However, in a preferred embodiment, by the time a second recommendation is completed on behalf of a single user, the first chunk representing the initial recommendation has already been delivered to the client and has been purged from data store 261.

A personal programming module 263 is provided and adapted to allow personalization of rules library 255 and knowledge base 257 on behalf of a client. In one embodiment personal programming module 263 is activated whenever recommendation engine 225 is invoked on behalf of a client. In this case, personalized data in the form of added rules and knowledge base data is stored in such as repository 227 of FIG. 11 and applied to (otherwise generic) rules library 255 and knowledge base 257. A multitaskable generic recommendation engine may be used in the above-described case.

In another embodiment, agent 263 is invoked periodically to apply personal rules and parameters to both library 255 and knowledge base 257 wherein such rules remain applied on behalf of a requesting user. In this case, a personal recommendation engine is created and stored for each subscriber and may only be used by its owner. There are many possibilities.

Generation layer 245 handles converting raw result data into a presentable format and specific media on behalf of a user. A data writer 265 is provided and adapted to convert or rewrite raw data results, which in some cases may not be human-readable, into legible information according to a user or system-specified format. A media library 267 is provided and adapted to contain various media options for presenting data. One option may be E-mail. Another option may be an ICQ™ message. Still another form may be an MPEG or .WAV message. A typical option would be to return data as hypertext markup language (HTML) to a user's active WEB browser for text display.

An applications module 269 is provided and adapted to insert data into desktop applications used by a client such as a word document, a draw document, a spreadsheet, or the like. In this way, a user/client may receive system reports in desired formats and through desired vehicles. For example, a series of recommendations may be ordered for a planned vacation trip wherein specific parameters such as vacancy pricing, car rental, restaurants and the like are targets of recommendations. Such businesses must have an online WEB page (URL) registered in a user's profile in order to be considered.

In one embodiment a user may program automatic recommendations to execute when he or she begins a session that is planned for a later date. For example, a user may plan to participate at a scheduled online auction or fashion show wherein hot buttons are provided for entering a bid or purchasing an item. When a user interacts, engine 225 operates by default and provides recommendations related to the activity. For example, if a user enters a bid for an auction item, a recommendation as to whether he should continue to bid higher or stop bidding may be received based on an average going price of that or a similar item through another site or sites. A recommendation associated with a purchase-now button may provide competitive pricing information from other sites, quality comparison information and a recommendation to purchase or not.

It will be apparent to one with skill in the art that a recommendation engine such as engine 225 may be a self-contained module with appropriate interface capability (as shown here), or a plurality of distributed components without departing from the spirit and scope of the present invention. For example, layer 241 and 243 may be part of one implementation running on a single processor whereas layer 245 (report generation) may execute at a machine supporting portal interface 223 of FIG. 11. There are many possibilities. Runtime engine 225 is enhanced, in this embodiment, with common object modeling (COM) functionality. In this way, user-friendly programming tool-kits (not shown) may be provided with instructions to guide a user or client in setting-up personal aspects of the recommendation service.

Figure 13:
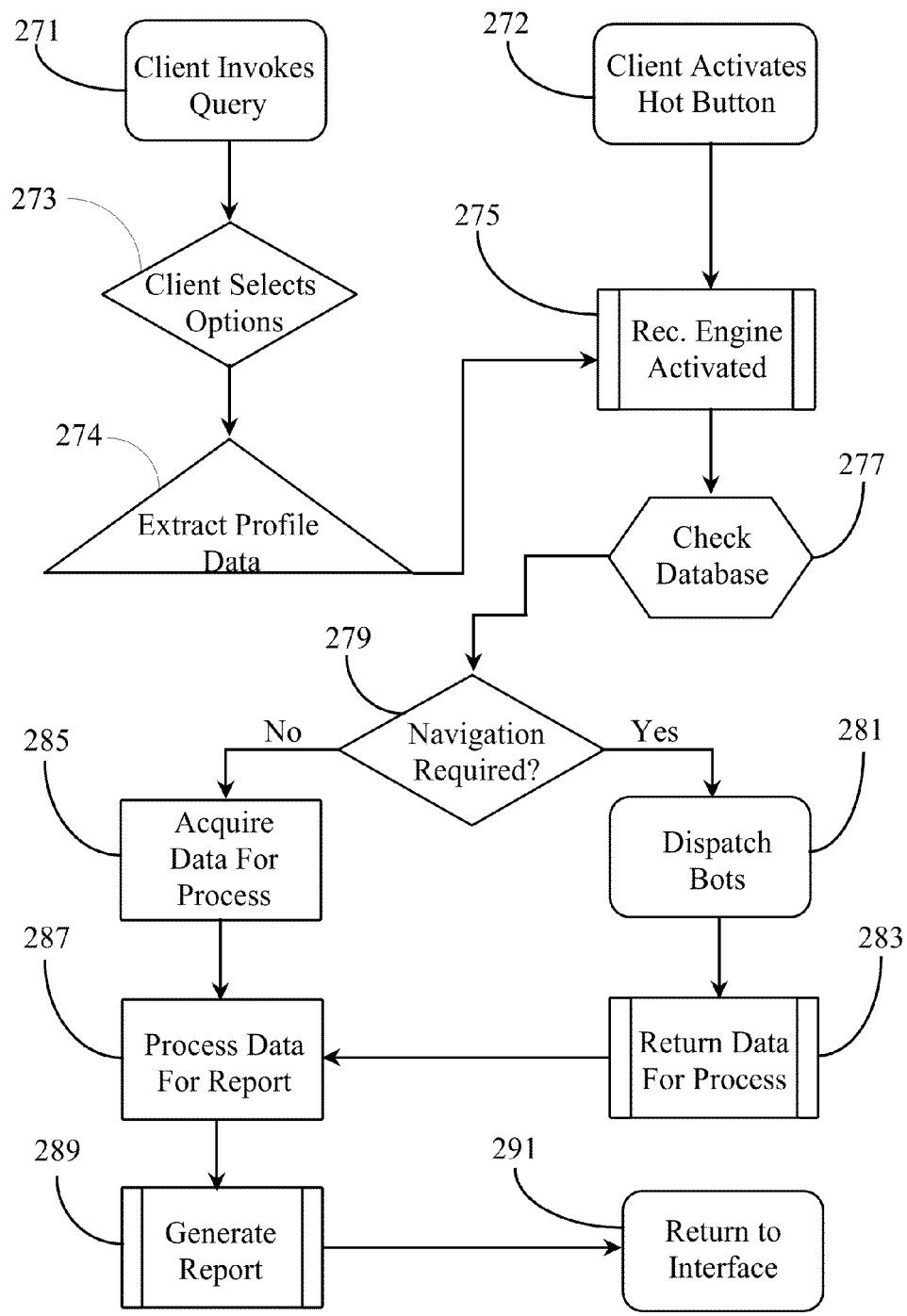
FIG. 13 is a process flow diagram illustrating an exemplary purchase recommendation process according to an embodiment of the present invention.

FIG. 13 is a process flow diagram illustrating an exemplary purchase recommendation process according to an embodiment of the present invention. At step 271, a client or user invokes a recommendation query process from his or her WEB browser while online with the portal service. Such a query is designed to inform other system components of the parameters required to provide an intelligent recommendation based on a user's planned activity. At step 273, a client or user selects from presented options, which reflect different types of recommendation possibilities.

It is assumed for this example that a client or user has had target URLs summarized by the service such that if a client selects "intelligent airline ticket purchasing" his or her profile information will include at least two URLs of travel sites from which he or she purchases tickets. The scope of options is limited only by system programming and a user's summarized WEB services. For example, if a user has only one summarized travel page then a recommendation cannot be performed unless the service keeps a database of WEB pages from which information may be tapped and offered to a user through advertisement.

Once a user has completed a recommendation query in step 273, profile information is extracted from a user's data profile at step 274. Such information would include a list of URLs related to the request, any special rules a user has programmed into his or her profile, and other data as may be required. Assuming that a user has completed a recommendation query, and profile data supports continuing, a recommendation engine is activated in step 275. In this case, a user has not navigated to any WEB site in order to make a purchase. He or she has used the query method in order to get a recommendation before personal navigation. In some cases, a means such as a hyperlink may be provided with recommendation data to enable a user to make the recommended purchase without navigating to the recommended WEB-service site.

In another embodiment of the present invention, a user may by-pass the query process described in steps 271, 273 and 274. That is, he may navigate through portal interface 233 (FIG. 11) to one of his or her summarized WEB services and initiate a purchase process by activating a hot button (purchase now link) contained in one of the visited WEB pages in step 272. In this case, a recommendation engine such as engine 225 of FIG. 12 is automatically activated by virtue of a monitoring process at step 275. Such a monitoring process may be activated either from a user's WEB browser, or from portal interface 233 as previously described. Such a monitoring process recognizes a user's mouse click on a purchase link and incorporates URL, item identification, pricing, and any other information associated with the activated hot button.

Click monitoring technology is known in the art and practiced with such as download-assist programs designed to speed up or aid a user in completing a download. In the case of downloading, the software is adapted to recognize a download now link. In the case of this example, the plug-in would be written to recognize a purchase link. It is noted herein that step 275 represents recommendation engine activation in both of the circumstances described above. Step 275 is illustrated as such for convenience in drawing only.

At step 277, recommendation engine 225 checks a database holding aggregated data such as in repository 227 of FIG. 11. Engine 225 looks for data that matches or is related to query and profile information in the case of a query method. In the case of a hot-button method, engine 225 looks for data including URLs that relate to information (data) about the URL and hot-button parameters describing the purchase item and price (if included).

If a user has all URLs of a WEB service summarized, then aggregated data will hold matching information to the specific URL that is active, as well as other data belonging to related WEB services that are also summarized. It is important to note here that all data including profile, identification, summary data, and so on is centralized and maintained by the recommendation service on behalf of all subscribers. However, it may be that some data has not been updated to "current status" or is missing for one reason or another. In a case such as this navigation for current data is required. Moreover, many types of data that may be considered for recommendation processing is updated continuously making navigation preferable by default in many cases.

At step 279, recommendation engine 225 decides if navigation will be required based in part on data found in aggregation, nature of recommendation, user directive, and other possible factors. If navigation is not required, then data is acquired from such as repository 227 to complete an intelligent recommendation process in step 285. At step 287, the data is processed as described in FIG. 12 regarding processing layer 243 and associated modules. During this process, user specified rules that have been pre-programmed may apply. If no such rules have been added then enterprise rules and limitations apply.

At step 289, raw result data is used to generate an intelligent recommendation report according to user-selected platform, media and delivery method (application) as described in FIG. 12 regarding report generation layer 245 and associated modules. A completed report is returned to interface 233 where it may be accessed by a requesting user or delivered to a requesting user in step 291.

In some cases, data in aggregation will be sufficiently current for producing an intelligent recommendation. However, navigation may be required in many cases. If it is determined at step 279 that navigation is required due to insufficient or non-current data, then agents (bots) are dispatched over the Internet to each required site to obtain data needed to complete an intelligent recommendation. At step 283, such data is returned to recommendation engine 225 for processing by such as layer 243 (FIG. 12) and associated modules. At step 287 collected data is processed for raw results as described above. Steps 289 and steps 291 cover report generation and delivery to an interface such as interface 233 (FIG. 11) as described above.

It will be apparent to one with skill in the art that the process steps described above may be altered somewhat in order and number without departing from the spirit and scope of the present invention. For example, step 273 may resolve to step 275 bypassing step 274. Step 274 may be integrated with step 277. The inventor intends that the process flow diagram of FIG. 13 is only exemplary of two such possible process flows that explain the query method of obtaining a recommendation, and the automatic method of obtaining a recommendation.

It will also be apparent to one with skill in the art that both methods described in the flow diagram presented herein may be programmed to execute in combination if so directed by a user. For example, a query method may be preferred for an initial recommendation about where to purchase an item. An automatic recommendation about the best way to pay for the item may be generated when a user activates a hot button to purchase the item.

In one embodiment of the present invention, statistical profiles reflecting a user's recommendation history are kept by the recommendation service of the present invention. Such profiles may be used to generate still further recommendations to users. Such system-generated recommendations may advise a user to drop a particular WEB service based on prolonged inactivity and may even suggest a more competitive service to replace it with. In some cases, new WEB services may be introduced to a user who demonstrates a recommendation history that logically supports their introduction. For example, if a user exhibits a recommendation history of repeated stock purchasing through several separate brokerages, then a new brokerage may be introduced that culminates the user's stock choices offered by two or more of the original brokerages. In this way, a user may streamline services and possibly save money in commissions.

Verification and Fraud Prevention Services

In one aspect of the present invention, a verification and fraud prevention service is provided that allows complete online verification of users to third parties and user control of security levels over established money accounts.

Figure 14:
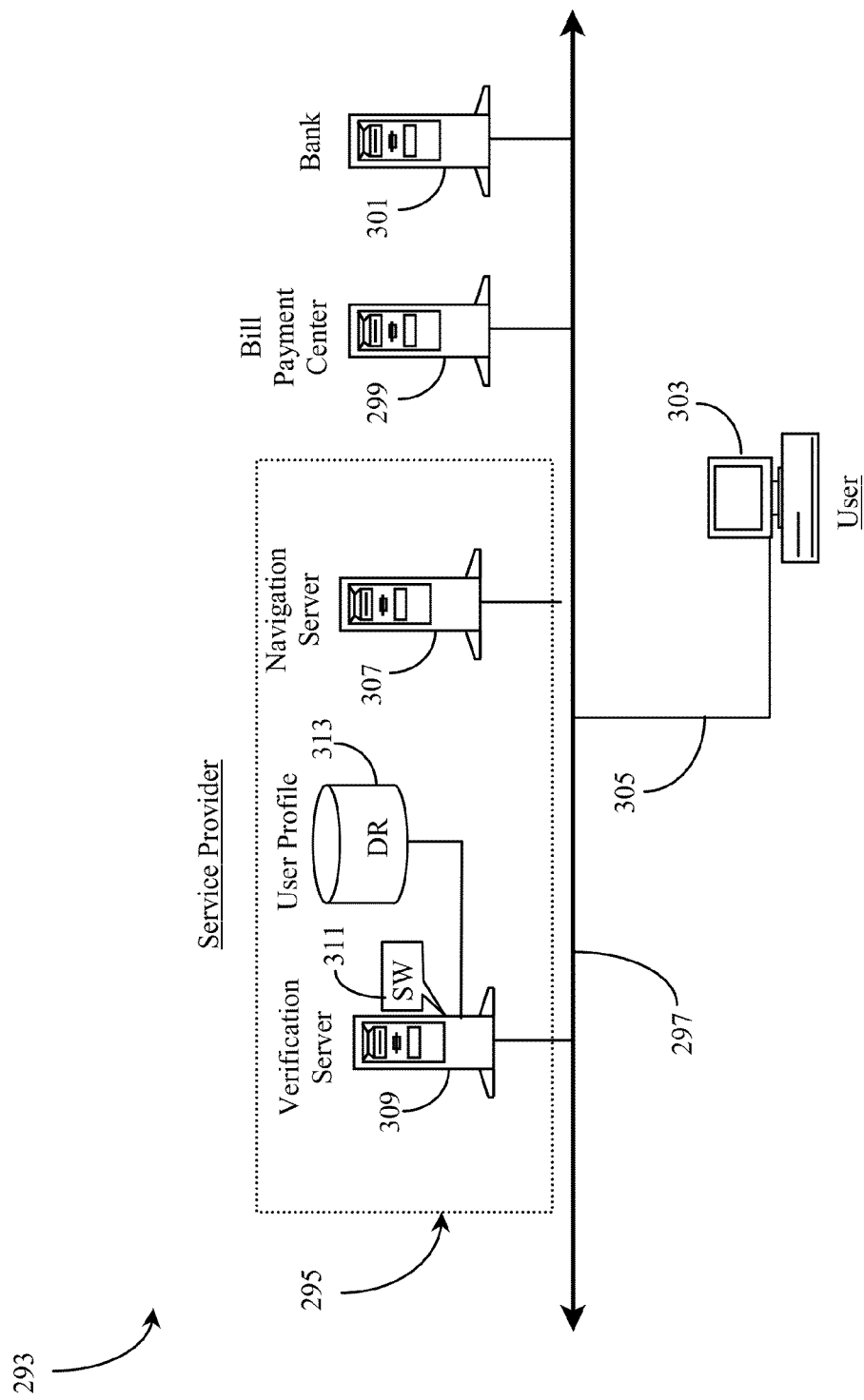
FIG. 14 is an architectural overview of a communication network wherein a user-verification service is practiced according to an embodiment of the present invention.

FIG. 14 is an architectural overview of a communication network 293 wherein a user-verification service is practiced according to an embodiment of the present invention. Communication network 293 utilizes a data-packet-network (DPN) represented herein by a network backbone 297. In a preferred embodiment of the present invention, backbone 297 is an Internet backbone supporting the well-known Internet network as known in the art.

Internet backbone 297 represents all of the lines, connection points, and equipment that make up the Internet network as a whole. Therefore, there are no geographical limitations to practice the present invention. The inventor chooses the Internet network as a preferred example because of its high public-access characteristic. However, the present invention may be practiced on virtually any DPN.

A service provider 295 is illustrated as enclosed within a dotted rectangle and having Internet connectivity to Internet backbone 297. Service provider 295 represents the data compilation, aggregation and summary service as taught in disclosure referenced by the various U.S. patent applications referenced in the Cross-reference section of this specification. Service provider 295 may be assumed to host all of the necessary equipment and network implementations for providing data-compilation, aggregation and summary services to subscribing users. In this example, equipment and network implementations necessary for providing an on-line verification and fraud-prevention service are illustrated.

A verification server 309 is illustrated within service provider 295 and is connected to backbone 297 by a network-connection line as is generally known in the art. Server 309 is adapted as a client interface for submission of data for user-verification purposes. A data repository (DR) 313 is provided within service provider 295 and is connected to server 309 by a high-speed data link. Repository 313 is adapted to contain user profile information maintained as part of general services provided by provider 295. Repository 313 may be assumed to be analogous to repository 29 of FIG. 1 of Ser. No. 09/208,740. Repository 313 may be an external repository as shown in this example, or it may be an internal implementation within verification server 309. Repository 313 may be of the form of a hard disk, optical storage system, or any other type of network data storage facility.

A navigation server 307 is provided within service provider 295 and is connected to backbone 297 by a network-connection line as was described above with reference to verification server 309. Navigation server 307 is adapted to navigate to network destinations, in this case Web sites, on behalf of requesting users utilizing user-authentication data incorporated into automated navigation sequences. Navigation server 307 may be assumed to be analogous to gathering sub-system 139 of FIG. 7 of Ser. No. 09/425,626. Server 307 is illustrated logically as a single machine in this example, however there may be a sizable network of connected machines providing navigation services on behalf of users.

An instance of software (SW) 311 is provided to execute on verification server 309. Software 311 is adapted to enable server 309 to exception process verification-requests communicated thereto by third party servers. It is important to note herein, then a verification server 309 running software 311 may be adapted to handle requests from third party clients as well as handling personalized interfacing with network-connected users. As such, server 309 may also function as a portal server as taught in co-related specifications listed in the cross-reference section. The inventor dedicates server 309 as a verification server for exemplary purpose only.

An exemplary the user 303 is illustrated in this example as having connectivity to Internet backbone 297 through an Internet-access line 305. It may be assumed in this example, that user 303 has access to Internet 297 through a public-switched-telephone-network (PSTN), as is generally known in the art. It may also be assumed in this example, that user 303 utilizes the services of an Internet-service-provider (ISP) in order to obtain Internet connection. User 303 may employ a personal computer (PC) or any other type of Internet-capable appliance for obtaining Internet access to Internet 297.

A PSTN and an ISP are not shown in this example but may be assumed to be present. There are other connection methods and networks through which Internet connection may be established between a remote user and an Internet network than are illustrated or described in this example. Such conventions are well-known and established in the art. The inventor describes Internet-connection through an ISP and PSTN and network as a preferred example because of commonality in the art has not of necessity to the invention.

A bill-payment center, represented herein by a server 299, is illustrated outside of the domain of service provider 295 and connected to Internet backbone 297. Server 299 represents available services of a bill-payment company that may be accessed online by virtue of accessing Internet 297. Server 299 is adapted to interface with connecting users with a purpose of providing third party bill-payment services. Server 299 may be adapted to provide services hosted by a company other than a bill-payment center without departing from the spirit and scope of the present invention. The inventor chooses a bill-payment center for exemplary purposes only. There are many other types of third-party services that may be available and offered over Internet 297.

In this example, is assumed that user 303 desires to subscribe to the services available through server 299. A server 301 is illustrated outside of the domain of service provider 295 and connected to Internet backbone 297. Server 301, in this example, represents a bank server hosted by a financial institution. It is assumed in this example that server 301 offers on-line banking services such as checking and savings account access and maintenance to subscribing users through Internet 297. It is also assumed in this example that user 303 subscribes to the on-line services offered through server 301 and will setup and account maintained at server 301 for use by server 299 to pay bills on behalf of user 303.

In prior art scenarios, the entity hosting server 299 would require user 303 to mail or walk-in authentication documents proving the identity of user 303 such as a driver's license, check stubs, utility bills or other documentation which may serve to identify and verify user 303 before on-line services may be activated through server 299. The goal of the present invention is to bypass and the off-line verification requirements so that user 303 may subscribe to and activate services offered through server 299 immediately.

In practice of the present invention, user 303 connects to Internet 297 via Internet connection line 305, which may include a PSTN and ISP interface. Once online, user 303 logs into server 299 in order to subscribe to bill-payment services offered. In one embodiment server 299 presents an electronic-information-page (Web page) that contains an interactive interface for accepting data input from user 303. In another embodiment of the present invention, user 303 may be automatically redirected to verification server 309, which would handle registration and verification of new users on behalf of the entity hosting server 299.

User 303 does not have to be a subscriber of the services provided by service provider 295 in order to be verified for a service offered through server 299. User 303 is prompted at server 299 to enter some personal data for revocation purposes. Examples of personal data that may be solicited may include, but are not limited to, user name, physical address, account number, phone number, e-mail addresses, and so on. Instead of requiring user 303 to mail or walk-in documents for verification purposes, server 299 simply solicits one or more user names and passwords to any other significant online accounts that user 303 may subscribe to. Examples of such accounts may include, but are not limited to, a mortgage account, an investment account, and ISP account, and so on.

Server 299 may handle data entry of user names and passwords belonging to user 303 and such a manner as they are not rendered in clear-text form that may be visible in an interactive form. Using a secure-socket-layer (SSL) protocol, server 299 may forward data input thereto by user 303 in the form of a verification request to server 309 within service provider 295. In this case, service provider 295 contracts with the entity hosting server 299 in order to provide verification service to clients of the entity.

Server 309 receives a verification request from server 299 through Internet 297 and processes the request by virtue of SW 311. SW 311 creates a temporary user profile constructed from data received in the request sent from server 299 on behalf of user 303. The user profile is stored in data repository 313. S W 311 constructs a navigation request containing the URL information along with user names and passwords supplied by user 303 and sends the navigation request to navigation server 307. In one embodiment of the present invention server 309 and 307 may be interconnected using a high-speed data network so that data may be passed between them without utilizing shared-bandwidth connection afforded by backbone 297.

A knowledge worker or an automated system (not shown) is utilized to create an automated navigation sequence using the data contained in the request forwarded to server 307. Such a navigation sequence contains navigation instruction and user login data required to enter or access a target site or sites specified in the request. Navigation server 307 navigates to each listed sites, logs and using data supplied by user 303 and reports back to verification server 309 as to success or failure of the automated sequence.

If an automated navigation sequence is successful, meaning that user-divulged sites are accessible using the login information supplied by the user then the user is assigned a high a score for verification. The scoring system used by service provider 295 may be as simple as a 1-10 rating or even a verified or not report. Verification results are sent back to server 299 over Internet 297 where they are analyzed to determine the disposition of user 303's service request.

After user 303 is processed for verification and the results are sent from server 309 to server 299, then server 309 may delete all user-profile information supplied by user 303. In one embodiment the temporary profile created on behalf of user 303 may be retained and access for further verification processes. In this case, user 303 may simply request verification without supplying any data at a next instance of on-line service procurement from a cooperating entity.

The verification system of the present invention assumes, of course, that user 303 has at least one and preferably more than one established online accounts that may be accessed using sensitive data belonging to user 303. A service provider such as the entity hosting server 299 may receive a high degree of comfort in knowing that a user has been able to provide more than one user-name and password set for accessing personal accounts held.

The preferred embodiment of the present invention, the service is enabled and maintained by service provider 295 and made available to entity's through contract such as the entity hosting server 299. The method of the present invention can be applied toward verification of any online user provided that user has online accounts for reference and verification purposes. In one embodiment of the present invention, user 303 may already subscribe to data compilation, aggregation and summaries services offered by service provider 295 in the general sense. In this case user 303 would already have his or her passwords and user names maintained by the service provider in a secure fashion. In such instances, an entity seeking to verify the user for an online account or service remote from the domain of provider 295 may simply forward the information provided by user 303 to provider 295 whereupon user 303 may be verified internally without proxy navigation.

Figure 15:
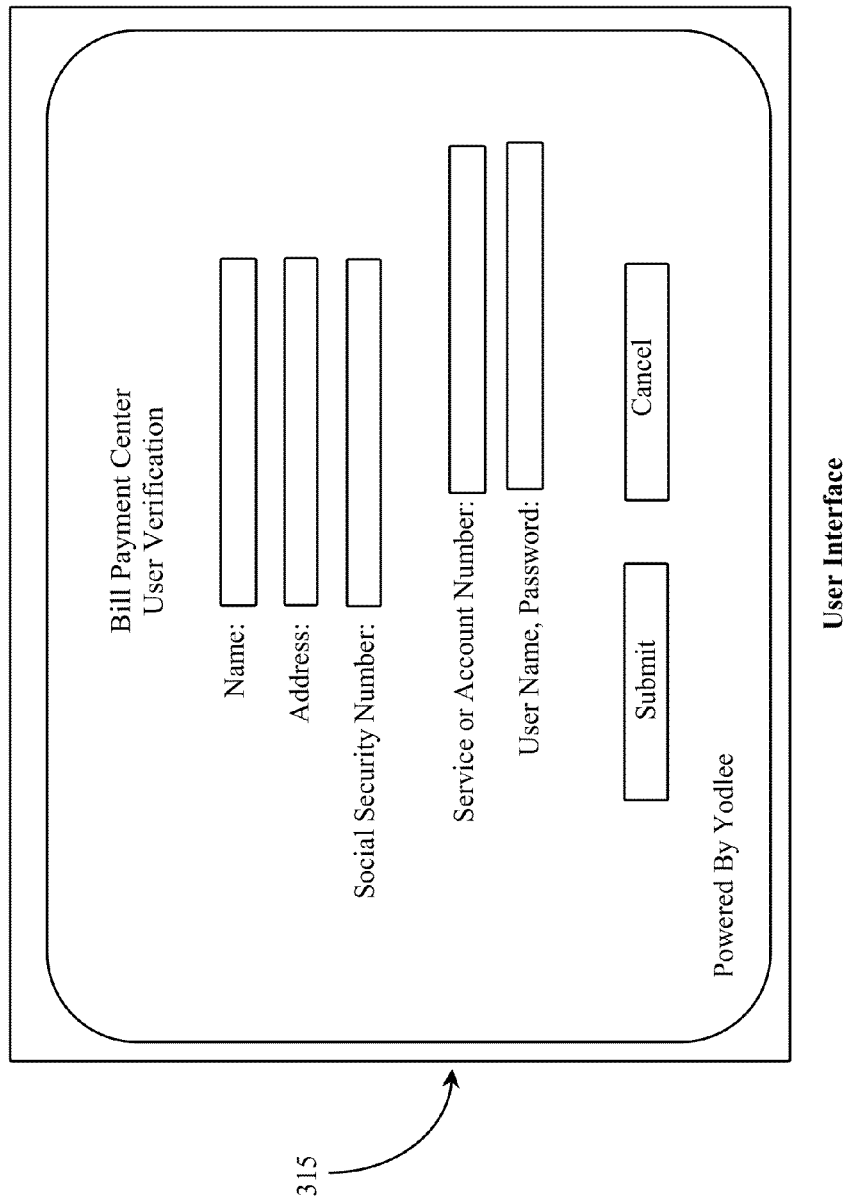
FIG. 15 is a plan view of an online interface for user verification according to an embodiment of the present invention.

FIG. 15 is a plan view of an online interface 315 used for user-verification according to an embodiment of the present invention. Interface 315 represents an exemplary online interface that may be presented to user 303 of FIG. 14. Interface 315 may, In one embodiment be part of SW 311 executing on server 309 of FIG. 14. In another embodiment, interface 315 can be hosted in server 299. In still another embodiment, interface 315 may be hosted in an additional server dedicated has a cobrand server and established for clients of the entity hosting server 299. There are many possibilities.

Interface 315 is, in this example, labeled Bill Payment Center User Verification, and is an interface that would be presented to all online users requesting new service. If interface 315 is provided and hosted by service provider 295 of FIG. 14, then it may be indicated somewhere thereon that the interface is powered by the provider. In this example interface 315 is powered by Yodlee, a company known to the inventor as is designated at the lower left corner of the plan view. In this case, interface 315 may be assumed to be a cobranded interface.

Interface 315 comprises a plurality of data entry fields, which together define an interactive form. For example, a field is presented for entry of a user name. Similar fields are provided for entering address and Social Security number. There may be additional fields provided for entry of data such as phone number, e-mail address, and so on.

Immediately below the illustrated field labeled Social Security Number, an additional field is provided for entry of a service or account number followed by any provided field for a user-name and password, which the requesting user employs to obtain access to the associated service or account. In this case, the service or account number field and the user name and password field are illustrated as single data fields. However, there may be additional fields provided for additional service or account numbers and associated user-name and password pairs. Similarly, the described fields may except a plurality of service or account numbers and a plurality of user-name and password pairs. The inventor illustrates only one of each field for the sake of simplicity and using sufficient for explanation of the present invention. In this example, it may be assumed that these data fields are submitted to and utilized by service provider 295 of FIG. 14 to verify the validity of the user account as described in FIG. 14.

Although not shown in this example, applicable fields for accepting URL data or any other data required for proxy navigation purposes may be assumed to be present somewhere within interface 315. A submit icon and a cancel-form icon are presented any convenient location on interface 315 such as at the end of interface 315. User 303 (FIG. 14) populates interface 315 and initiates submission of the form by invoking the submit function or another like sent action.

SW 311 (FIG. 14) incorporates the data submitted with form 315 to create temporary profile and to initiate a navigation order for navigating to the destinations listed in the form. In this way, users may obtain immediate online registration and activation of service accounts without being required to provide hard-copy documentation of utility bills, drivers licenses, or any other user-identifying documents.

The method and apparatus of the present invention may also be used in an off-line scenario. For example, referring back to FIG. 14, user 303 may walk into a storefront location (not shown) maintained by the entity hosting server 299. In this case, user 303 may employ an Internet-capable station for entering data for verification purposes. Such an Internet-capable station may be a desktop computer provided and adapted for the purpose of excepting data for verification purposes and transmitting the data to service provider 295. In the just-described scenario an advantage still may be had for users who walk into register but failed to bring applicable proof of identification. The method and apparatus of the present invention can be employed to verify users attempting to register for third-party services and to verify users attempting to set up online accounts with financial institutions.

Fraud Prevention Service

In one aspect of the present invention, a service is provided that enables users having online accounts at financial institutions to control a measure of fraud prevention that may be applied to any account a user has registered with the service.

Figure 16:
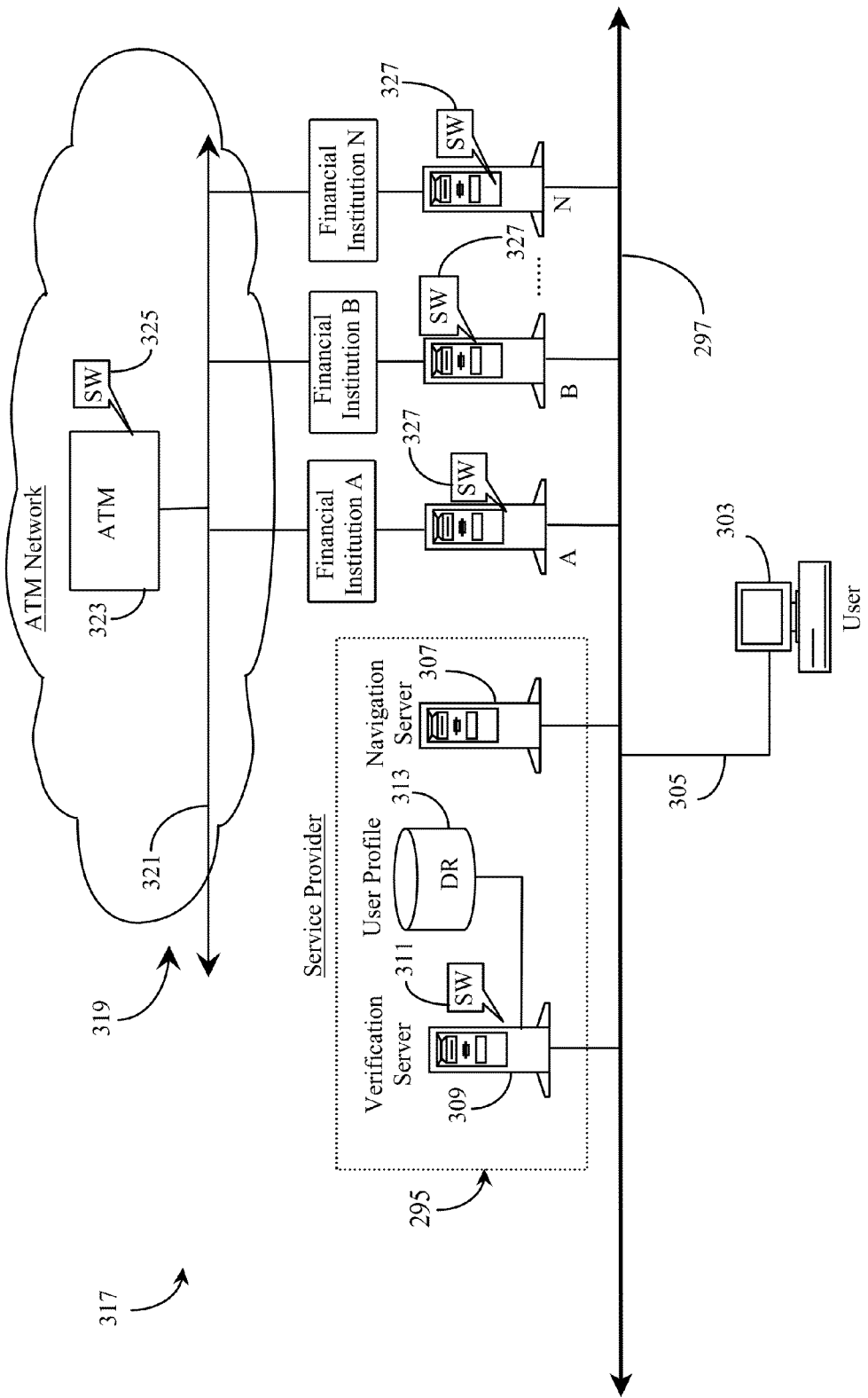
FIG. 16 is an architectural overview of a communication network wherein a fraud prevention service is practiced according to an embodiment of the present invention.

FIG. 16 is an architectural overview 317 of a communication network wherein a fraud prevention service is practiced according to an embodiment of the present invention. Communication network 317 may be assumed to be analogous to communication network 293 of FIG. 14 above except for an addition of an automated-transfer-machine (ATM) network 319. Some of the elements introduced an example of FIG. 14 are also present in this example. Therefore, these elements will retain their introductory element numbers.

Service provider 295, in addition to providing verification services as described above, provides a novel fraud prevention service that may be employed by user 303 for the purpose of preventing unauthorized payment of monies from any financial accounts a user subscribes to. In this example, there are illustrated a plurality of servers A-N connected to Internet backbone 297, which represent interfacing servers hosted by financial institutions A-N has so labeled. The servers A-N are adapted as interfacing servers through which user 303 may view and manipulate (online) aspects of financial accounts held in each of the hosting institutions.

It is assumed in this example, that user 303 has financial accounts in each of the servers illustrated. Financial institutions A-N contract with service provider 299 in order to receive fraud prevention services for all their clients. Servers A-N each have an instance of software (SW) 327 provided therein and adapted to communicate with SW 311 resident in server 309.

In this case, SW 311 is enhanced with the capability of accepting online account information and maintaining an interactive Web interface on behalf of each user that registers accounts with the service. Verification server 309 is further enhanced to serve personalized Web interfaces (Web pages) to requesting users for the purpose of viewing a list of registered accounts and for activating or deactivating the fraud prevention service specific to any one or a combination of listed accounts.

In one embodiment the fraud prevention service may be offered to users whom have received verification services for online registration of financial accounts. In another embodiment, financial institutions may offer the service to all of their existing user-accounts regardless of how they were created (online or off-line). All that is required of each financial institution participating with service provider 295 to provide fraud prevention services is that they maintain an online presence such that service provider 295 may update the files of registered accounts. SW 327 communicating with SW 311 provides the just-described capability.

Financial institutions A-N are connected to ATM network 319 via network lines as is currently known in the art. ATM network 319 provides ATM access for users having bankcards or credit cards specific to accounts held in financial institutions A-N. It is generally known the art, that ATM network 319 provides user access to accounts from a wide range of interfaces such as ATM machines and a wide range of storefront devices. Users may engage in various interactive transactions through ATM-connected machines. Examples include, but are not limited to depositing funds, withdrawing funds, transferring funds, purchasing, purchasing with cash back, and so on. Generally speaking, cards are issued to users by the financial institutions for a specific account. For example, a specific bankcard may be linked to a checking account. Some bankcards double as credit cards. Traditional credit cards they also be used at ATM interfaces.

ATM network 319 further comprises an ATM control server 323 adapted for controlling functional aspects of network 319. Control server 323 is connected to an ATM backbone 321, which represents all the network connections and equipment-access points contained in the ATM network as a whole. Financial institutions A-N are illustrated as having ATM connectivity by their network connections to backbone 321. An instance of software (SW) 325 is provided within control server 323 and adapted to allow the fraud-prevention service of the present invention can be applied at all ATM locations.

User 303 may access verification server 309 by logging onto Internet 297 via Internet access line 305 and logging into server 309. Once logged into server 309, user 303 may view a list of accounts held in financial institutions A-N. Service provider 295 maintains a user profile on behalf of user 303 and data repository 313. In one embodiment such user profiles maybe extended, and now permanent versions of the temporary verification profiles that were described with reference to FIG. 14 above.

If user 303 should lose a credit card, checkbook, bankcard, or otherwise suspect unauthorized use of any of the above, he or she may login into verification server 309 and activate fraud prevention for any of the accounts that the user feels has been compromised. For example, assume that user 303 has a checking account with financial institution A. Also assumed that institution A has issued user 303 a bankcard, which may be used in-place of writing checks on the account. The checking account issued by financial institution A will have a unique personal-identification-number (PIN) number associated therewith that was created by user 303. In using the issued bankcard user 303 must key in the unique number in order to complete a transaction at any ATM location that accepts the card. Assume now that user 303 has lost his bankcard or that has been stolen.

In a prior art scenario, the exemplary situation described above would require that user 303 place a call to financial institution A and deactivate the compromised bankcard. Financial institution A must then issue another card and user 303 must ultimately create another PIN number for the card before it may be used at ATM location. Furthermore, user 303 must wait for the new card to arrive in the mail, and travel to the institution in order to create and activate the new PIN number.

A unique solution provided by the fraud-prevention service of the present invention allows user 303 to logging into verification server 309 and access a list of registered accounts in the form of an interactive interface (Web page). Once user 303 is authenticated at server 309 and served the interface containing a list of all registered accounts, user 303 may select the account associated with the compromised bankcard and activate fraud prevention. SW 311 will then generate a secondary PIN number an associate the new PIN number with the existing account number and the existing PIN number associated with the account. The new PIN number is given to user 303 and to financial institution A where SW 327 applies the new PIN number to the compromised checking account of user 303.

Financial institution A will not pay monies from the compromised account of user 303 unless both PIN numbers, the primary and secondary, are keyed in at any ATM location. A software instance (SW) 325, running on ATM control server 323 within ATM network 319 Institutes the requirement of the randomly-generated PIN number to be keyed in at any participating ATM location. In a preferred embodiment of the present invention, financial institution A fish responsible for activating the secondary PIN number with ATM services. This process may be handled by communication between SW 327 and SW 325.

Once fraud prevention has been instituted as described above, an unauthorized person attempting to utilize the compromised bankcard of user 303 will not be successful at any ATM location even if he has also compromised or guessed the primary PIN number of user 303. Because the secondary PIN number is randomly generated after the bankcard of user 303 was compromised, there is no way an unauthorized person may obtain it. It is known only to institution A, user 303, and provider 295.

By practicing the fraud-prevention method of the present invention, user 303 may still use the compromised account while waiting for a new card. If user 303 subsequently discovers that he had only misplaced the bankcard and question, then he or she may log into verification server 309 and deactivate the fraud-prevention service for the specified account. Upon deactivation, software 311 destroys knowledge of the secondary PIN number and sends an alert to institution A to do the same. In a preferred embodiment, financial institution A deactivates the secondary PIN number at the ATM network level.

In one embodiment of the present invention, verification server 309 may be adapted to alert both ATM control server 323 executing SW 325 and financial institution A executing SW 327 at server A. In this case, a network connection would be required from verification server 309 to ATM backbone 321.

One unique aspect of the present invention is that user 303 may register accounts from all of financial institutions A-N at verification server 309 such that they may all be manipulated through a single interface. Financial institutions A-N may offer this unique service to all holders of money accounts.

Referring back into the example described above of a compromised bankcard, it may be that the bankcard and question may also be used as a credit card. In this case, purchase locations may not require submission of a PIN number for identification. This is especially true when purchasing through a telephone or data network. In the case of non ATM uses of this kind, the secondary PIN number installed at financial institution A and associated with the compromised account of user 303 may still be considered a reason to deny payment of monies from the account and question. For example, if user 303 continues to use the compromised bankcard and telephone purchases, network purchases, or in person, then he may manually indicate the secondary PIN number during the transaction such that financial institution A will recognize that the purchase was in fact made by user 303. In an example of check writing, user 303 write the secondary PIN number somewhere on the check itself indicating to a teller that user 303 indeed wrote the check. Likewise, if an individual attempt to write a check for cash at financial institution A using a compromised check belonging to user 303, then a teller processing the transaction will ask the individual for the secondary and number.

It will be apparent to one with skill in the art, that the fraud-prevention service taught above may be applied to any type of financial account held at any financial institution. It is not specifically required that the financial institution receiving the fraud-prevention service have an online presence or online connectivity. It is possible that ATM network 319 be used as a communication medium between the financial institutions and service provider 295. The online connectivity of financial institutions A-N has represented in this example is a convenience to the practice of the present invention and not a requirement.

In one embodiment of the present invention, user 303 may be verified online for a financial account and any one of institutions A-N, and then elect fraud prevention service to be installed for that account. As was described with reference to the verification and service of FIG. 14, user 303 may be automatically directed from one of institutions A-N, after online verification an establishing the new account, to verification server 309 for account registration. In another embodiment, financial institutions A-N may automatically register user 303 at service provider 295 upon user request.

In still another embodiment of the present invention, user 303 may obtain additional services directly from service provider 295, such as the ability to perform online transactions at his or her various accounts through the single interface listing the accounts. Likewise, other services offered by provider 295 such as data compilation, aggregation, and summaries services they also be obtained.

It is noted herein, that PIN generation at financial institutions is performed such that each PIN number is unique to the user it is issued to. The same protocol may be used at service provider 295 such that no register user is issued a same secondary PIN number in the event of fraud-prevention activation to one or more of their registered accounts. Furthermore, if user 303 were to activate a plurality of registered accounts for fraud-prevention, the secondary PIN number may be universal for all the accounts. Because the randomly generated PIN number is a secondary number, and primary PIN members at institutions are not altered or replaced, the method and apparatus of the present invention does not conflict with PIN number generation systems used at financial institutions.

Figure 17:
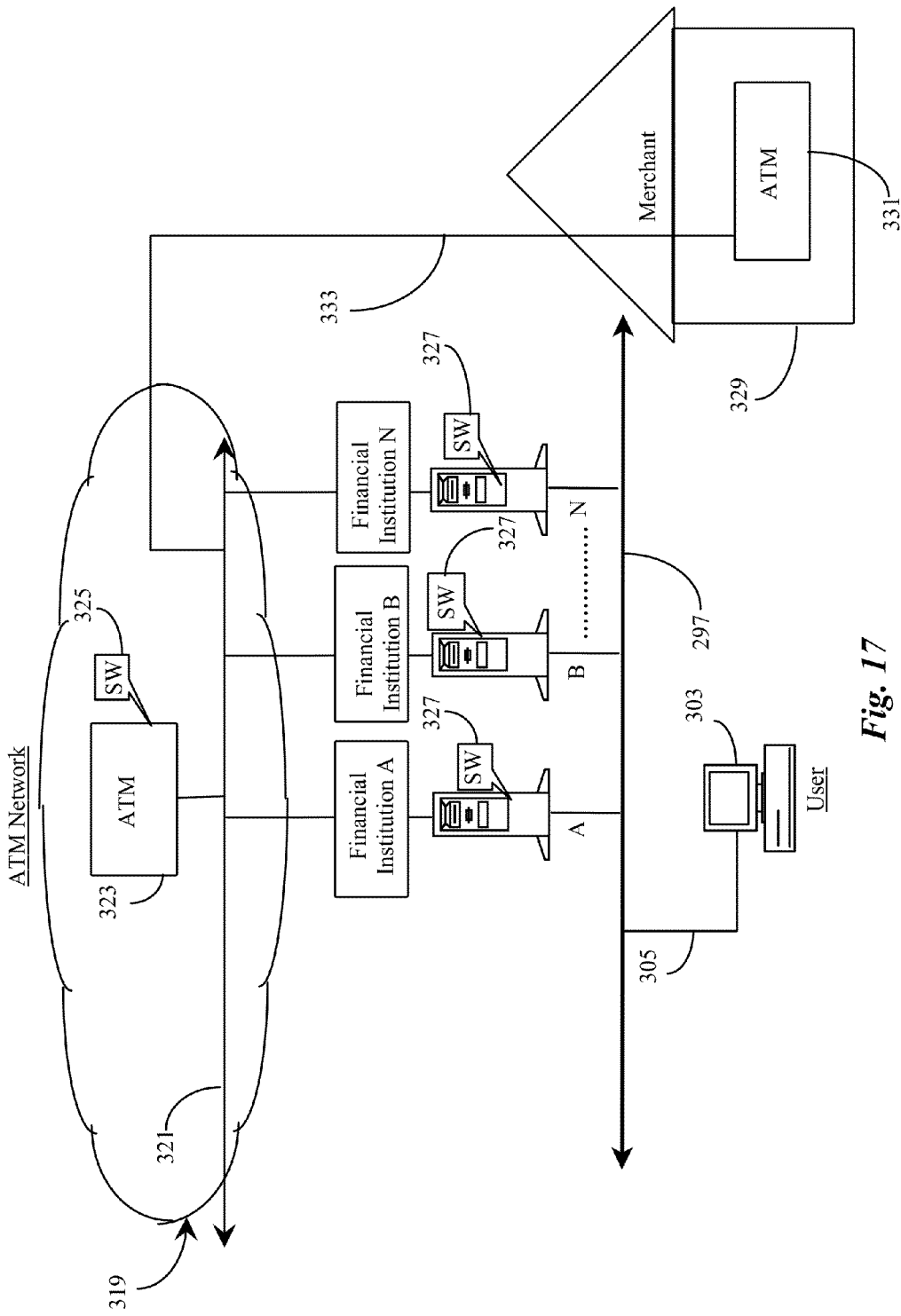
FIG. 17 is an extension of the network of FIG. 16 further illustrating merchant connectivity and functionality.

FIG. 17 is an extension of the network of FIG. 16 further illustrating merchant connectivity and functionality. In this example, a merchant 329 is illustrated having an ATM device 331 provided therein for accepting ATM cards and bankcard from customers for completing automated purchases. In ATM device 331 is illustrated, and this example, as connected to ATM backbone 321 by virtue of an ATM network-connection line 333.

Merchant 329 may be a grocery store, retail outlet, or any other merchant having ATM capabilities. Likewise, ATM 331 may be any type of ATM interface wherein ATM cards and credit cards may be read and authenticated for approval of automated purchases. It is assumed in this example that user 303 has a bankcard that has been compromised and has activated fraud-prevention services as described with reference to FIG. 16.

An unauthorized user entering the location of merchant 329 and attempting to conduct an automated purchase with the compromised bankcard at ATM device 331 will be asked to provide to PIN members in order to authorize the purchase. If the unauthorized user has compromised the primary PIN number, he or she will still be prevented from conducting an automated purchase because there is no way he or she will be able to provide the secondary PIN number. However, and authorized user may conduct an automated purchase with merchant 329 at ATM device 331 by simply providing the secondary PIN number in addition to the primary number when prompted to do so at the device.

FIG. 18 is a plan view of an online interface 335 for enabling fraud-prevention activation according to an embodiment of the present invention. Interface 335 is, in a preferred embodiment, part of an interactive web page made available for a verification server 309 of FIG. 16. Interface 335 is created and implemented by virtue of S W 311 running on verification server 309. An alternative in embodiments interface 335 may be made available through servers other than server 309. For example, interface 335 may be available through servers A-N of FIG. 16 or through a dedicated cobrand server maintained by provider 295. There are many implementation possibilities. Likewise, a version of interface 335 may be made available through such as an interactive-voice-response (IVR) interface.

Interface 335 is constructed such that at least minimum account information is available and viewable through the interface. In this example, there are 5 columns of data presented within interface 335. Reading from left to right, a first column labeled Account is illustrated for listing account numbers and account types. A second column labeled Institution is illustrated and lists the names of the financial institutions from which the listed accounts were obtained. A third column labeled ON presents interactive selection boxes for fraud-prevention activation. A fourth column labeled OFF presents interactive selection boxes for fraud-prevention deactivation. A fifth column labeled PIN # is illustrated for listing PIN numbers that are generated in the event of fraud-prevention activation on any of the listed accounts.

Under the column labeled Account, there are listed 2 credit card accounts, 2 ATM card accounts, and 2 savings accounts. It is important to note herein, that a single money account obtained from a financial institution may have more than one exchange component. For example, a checking account will have printed checks as one medium of exchange and, perhaps, and ATM card has a second medium of exchange. Furthermore, one ATM card obtained from a financial institution may be linked to more than one account number. For example, a single ATM card can be linked to a savings account and a checking account. For this reason, the fraud-prevention service of the present invention may be broken down such that it can be applied to separate mediums of exchange listed in interface 335 even though the account number may be the same.

To illustrate this functionality, one can assume the listed ATM accounts are linked to a checking and savings account maintained at the institution which, in this example, is $1^{st}$ bank. A user may notice that his savings book containing savings withdrawal slips is missing but the associated ATM card and PIN number were not compromised. In this case, the user may activated fraud-prevention on the savings account book (medium of exchange) but not on the card. This action allows the user to continue to use the ATM card to access the savings account, but prevents an unauthorized user from taking the savings book into a branch of the issuing financial institution and withdrawing money from the account.

In one embodiment secondary PIN numbers may be unique to each separate account or each separate medium of exchange. In another embodiment, PIN numbers may be universal such that if a user has selected ON (service activation) for one account, subsequent ON selections receive the same secondary PIN number. In this way, further convenience may be afforded a user by the user only having to remember one secondary PIN in the event of multiple account activation for fraud-prevention services.

Interface 335 associates all account information on a single horizontal row. For example, the first horizontal row contains a credit card account number, which is a Visa account having fraud-prevention activated and a randomly generated PIN number present. Each subsequent row is constructed identically. In one embodiment there may be more account data illustrated within Interface 335 than is presented in this example. Likewise, there may be functionalities added to Interface 335 without departing from the spirit and scope of the present invention. One of these functions could be linking Web destinations to the actual site names or account numbers enabling a user to navigate directly to a selected site using Interface 335 as a jump-off point.

One with skill in the art will recognize that there may be more interactive options associated with interface 335 than are illustrated herein. Moreover there are any number of ways in which interface 335 may be presented in terms of look and feel without departing from the spirit and scope of the present invention. The inventor intends that interface 335 represent just one example of an interactive interface that may be provided with the purpose of activating or deactivation the fraud-prevention service.

Figure 19:
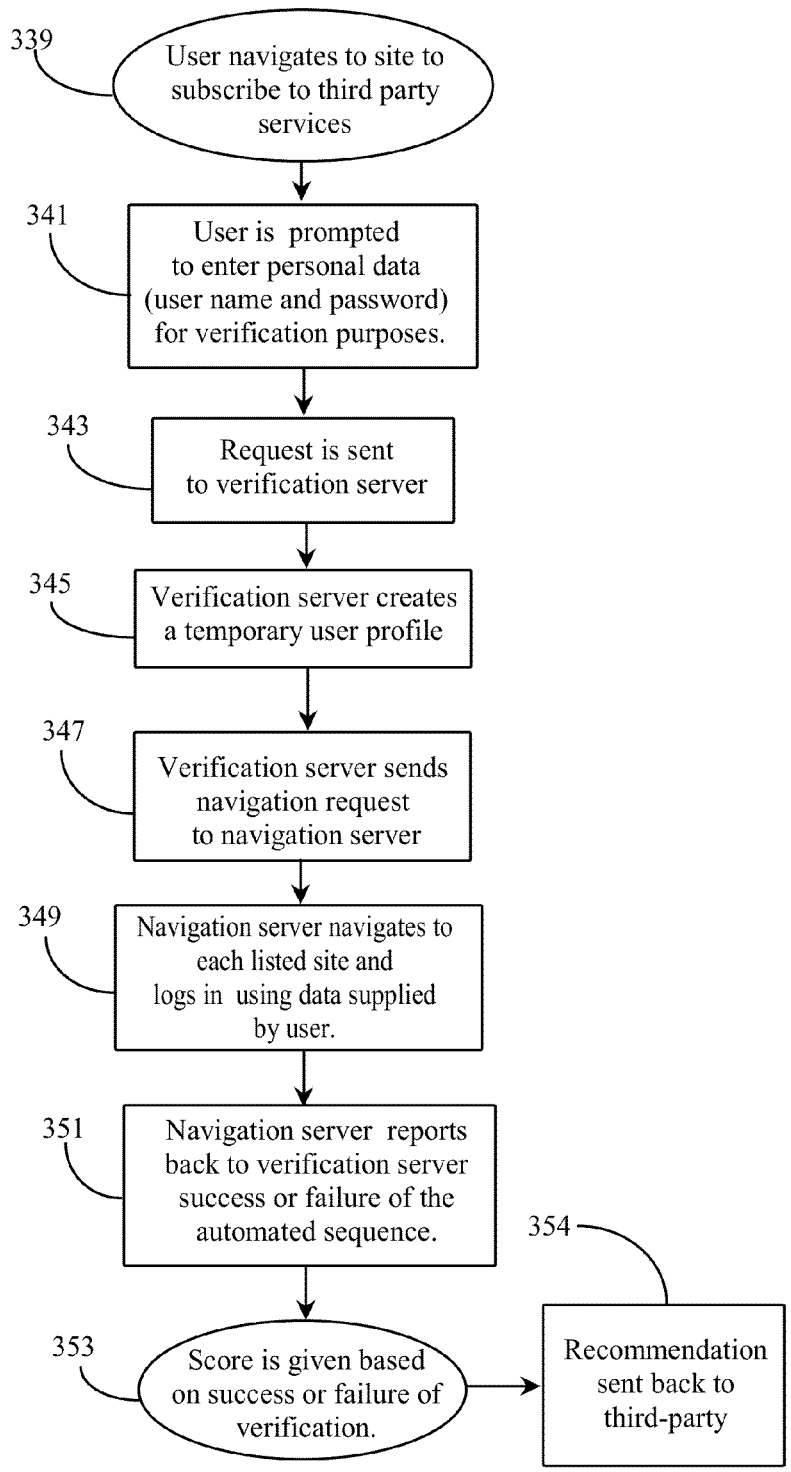
FIG. 19 is a process flow diagram illustrating various steps for practicing the user-verification service of the present invention.

FIG. 19 is a process flow diagram illustrating various steps for practicing the user-verification service of the present invention. At step 339 a user having online connection navigates to a server hosted by a third party service for the purpose of registering to that service online. Once connected, the user is prompted to enter personal data along with at least one user name and password set belonging to an unrelated online account held by the user. The data solicited from the user at step 341 is used for verification purposes. An interactive interface made available through the third party server is, in preferred embodiments, used for data entry and submission of the information.

At step 343, the information is sent in the form of a verification request to a verification server hosted by the entity providing the verification service. The verification request is received at the verification server and a user profile is created at step 345. At step 347 the verification server formulates a request for automated navigation containing all of the pertinent information required to incorporate into a navigation order. The navigation request is sent to a navigation server hosted by the same service provider.

At step 349 the navigation server navigates to each specified site and accounts log and at each site using the sensitive data supplied by the user in the original verification request.

At step 351 the navigation server reports back to the verification server has to the success or failure of the navigation sequence executed according to the request. The report sent back to the verification server may contain a verification approved or verification denied recommendation. In one embodiment a score may be created based on navigation and login success, the report being generated at the verification server in step 353. Step 353 is optional in this example. At step 354, a complete recommendation is sent back to the requesting server, which is the third party server attempting to verify the user.

It will be apparent to one with skill in the art that the steps illustrated herein may be altered somewhat in description and order without departing from the spirit and scope of the present invention. The inventor intends that process flow 337 represents one example of a communication and interaction sequence that may be used to verify a user online to receive third-party services. If verification is successful and the user is given an online money account such as a checking account or credit card account, then the user may be given an option to install fraud-prevention services to that account.

Figure 20:
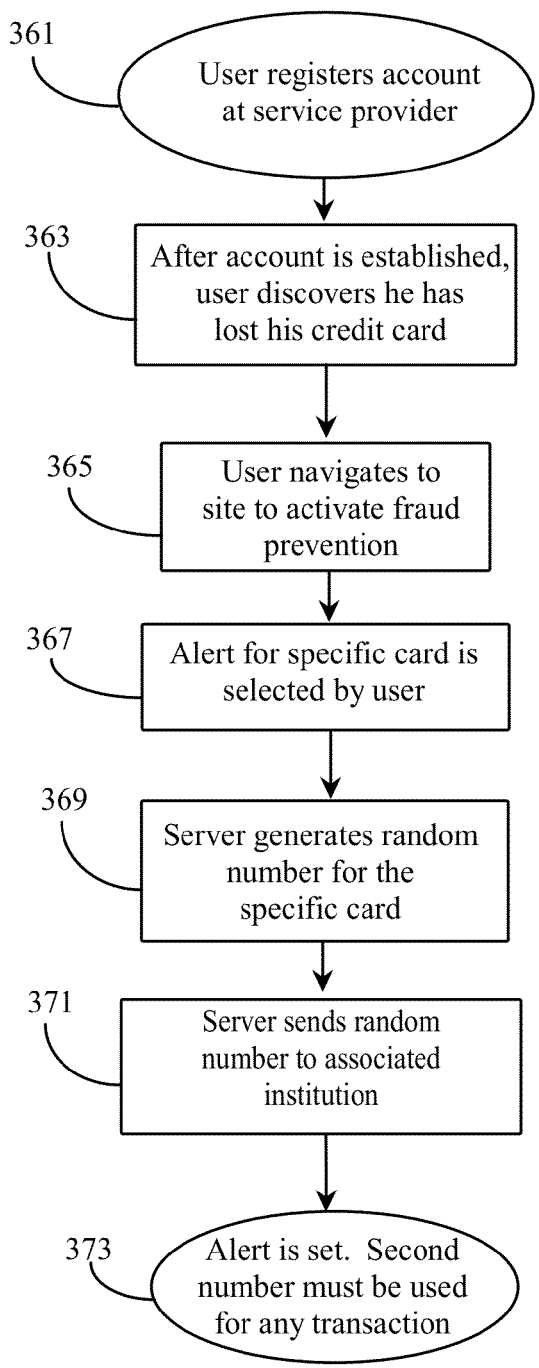
FIG. 20 is a process-flow diagram illustrating various steps for initiating and invoking a fraud-prevention service to a registered account.

FIG. 20 is a process-flow diagram illustrating various steps for initiating and invoking a fraud-prevention service to a registered account. At step 361, the user registers an established account with a service provider providing the fraud-prevention service. In a preferred embodiment the service provider maintains a server adapted for the purpose such as the verification server of FIG. 19. An interactive interface is served to the user upon authentication at the server. In one embodiment the interface may already contain the user's information if it was forwarded thereto by the financial institution providing the account to a user. In another embodiment the user may simply to navigate to the server and register the account by entering the required data in a provided interface. A permanent user profile may be created on behalf of a user at the time of registering the new account if it is the first time that the user has used the service.

After a new account has been established and registered at step 361, the user may discover at step 363 that he has lost his credit card (credit card account) or any other medium of exchange of the account such as printed checks (checking account), ATM card (checking and savings account) or the like. Step 363 may also encompass a state where in the user simply feels one or more of his accounts has been compromise in some way even though cards and checks etc. are not missing. Upon this discovery, the user navigates to the server hosted by the service provider in step 365, authenticates, and receives an interactive interface listing the account parameters and activates the fraud-prevention service to the account in question.

At step 367, the user specifies a large with a specific card or account in question. This may be accomplished by simply selecting an interactive box provided for the purpose and submitting the selection once completed. It is noted herein that step 365 and 367 actually contain more than one sub-step or action that must be performed by the user. In order to save space in drawing, the inventor incorporates those sub-routines into generalized process steps.

At step 369 the server generates a random PIN number for the activated account. One universal PIN number may be generated to cover more than one activated account listed within the user's interface. In some embodiments such generated PIN numbers may be specific to each activated account. At step 371, the server sends notification of the generated PIN number to the financial institution associated with the account. This may be accomplished by server-to-server communication over the data network, or by utilizing the ATM network as the communication network.

At step 373 the fraud-prevention alert is set at the institution. While the fraud-prevention service is activated for the selected account, the financial institution may not payout monies to requesters on the account unless both a primary and secondary PIN numbers are given.

It will be apparent to one with skill in the art that the process steps illustrated in this example may be altered somewhat in description and order without departing from the spirit and scope of the present invention. Similarly, there may be added sub routines to process depending on a number of variables such as type of account, medium of exchange restricted, and so on. The inventor intends to illustrate just one example of a process for setting a fraud-prevention alert to an effected money account.

The method and apparatus of the present invention may be practiced on any DPN including the Internet network, an Intranet network, a corporate or private wide-area-network (WAN), and so on without departing from the spirit and scope of the present invention. In an alternate embodiment, the method and apparatus may be practiced over a telephone network using IVR functionality. In this case, automated navigation sequence is would still be conducted over a data packet network.

The method and apparatus of the present invention may be applied equally well to new customers as well as to customers whom subscribe to other service offered by service provider 295. In the case of existing clients, automated navigation sequence is for verification purposes would not be required has user names and passwords could be checked internally.

The methods and apparatus of the present invention enjoy many variant embodiments, many of which have been described in this specification. Therefore the methods and apparatus of present invention should be afforded the brother scope possible under examination. The spirit and scope of the present invention is limited only by the claims that follow.

What is claimed is:

1. A system for authentication, comprising:
   an Internet-connected server providing services; and
   software executing on the server from a non-transitory physical medium, the software providing:
   a function for receiving a request for authentication from a person seeking service at the server;
   a function for requesting by the server a plurality of unique username/password pairs used for log-in for the person at a separate Internet site for each username/password pair, each separate Internet site remote from the server;
   a function for logging in by the server at the remote sites on behalf of the person, using the username/password pairs provided by the person; and
   a function for returning a score based on success or failure of the logins and authenticating the person at the server for interaction with the server based on the score.

2. A method for authentication, comprising steps of:
   (a) accepting by a server an authentication request from a person;
   (b) requesting by the server a plurality of separate, unique username/password pairs for login at separate URLs for one or more sites, each of the sites remote from the server;
   (c) attempting to log-in by the server as the person at the one or more remote sites;
   (d) returning a score based on success or failure of the logins; and
   (e) authenticating the person by the server based on the score.

3. The system of claim 1 wherein a profile is created and stored for the person seeking service including the username/pas swords and Internet sites, and deleted after authentication, failure of authentication, or saved for future authentications.

4. The method of claim 2 wherein a step is provided for creating and storing a profile for the person seeking service including the username/passwords and URLs, and deleted after authentication, failure of authentication, or saved for future authentications.

* * * * *